United States Patent
Ogawa

(10) Patent No.: US 9,072,111 B2
(45) Date of Patent: Jun. 30, 2015

(54) TRANSMISSION STATION, RECEIVING STATION, WIRELESS COMMUNICATION SYSTEM, AND WIRELESS COMMUNICATION METHOD

(75) Inventor: Daisuke Ogawa, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/413,885

(22) Filed: Mar. 7, 2012

(65) Prior Publication Data

US 2012/0236832 A1 Sep. 20, 2012

(30) Foreign Application Priority Data

Mar. 15, 2011 (JP) ................. 2011-057287

(51) Int. Cl.
 *H04W 72/08* (2009.01)
 *H04L 5/00* (2006.01)
 *H04L 27/26* (2006.01)
 *H04W 72/04* (2009.01)

(52) U.S. Cl.
 CPC ............ *H04W 72/085* (2013.01); *H04L 5/001* (2013.01); *H04L 27/2605* (2013.01); *H04W 72/0453* (2013.01)

(58) Field of Classification Search
 CPC . H04W 72/0446; H04W 84/12; H04W 84/18; H04W 28/04; H04W 28/06
 USPC .................. 370/336, 252, 329, 342; 455/522
 See application file for complete search history.

(56) References Cited

U.S. PATENT DOCUMENTS

| | | | | |
|---|---|---|---|---|
| 8,300,588 B2* | 10/2012 | Blankenship et al. | ........ | 370/329 |
| 8,359,038 B2* | 1/2013 | Hakola et al. | ................ | 455/450 |
| 8,369,209 B2* | 2/2013 | Zhang et al. | .................. | 370/216 |
| 8,489,145 B2* | 7/2013 | Suemitsu et al. | ............. | 455/560 |
| 8,538,415 B2* | 9/2013 | Vachhani et al. | ............. | 455/423 |
| 8,588,800 B2* | 11/2013 | Iwamura et al. | ........... | 455/452.1 |
| 2008/0085710 A1* | 4/2008 | Prateek | ......................... | 455/436 |
| 2008/0274742 A1* | 11/2008 | Bi | ................ | 455/437 |
| 2009/0046641 A1* | 2/2009 | Wang et al. | .................. | 370/329 |
| 2009/0046701 A1* | 2/2009 | Nishio et al. | .................. | 370/350 |
| 2009/0168731 A1* | 7/2009 | Zhang et al. | .................. | 370/336 |
| 2010/0208674 A1* | 8/2010 | Lee et al. | ..................... | 370/329 |

(Continued)

FOREIGN PATENT DOCUMENTS

| | | |
|---|---|---|
| JP | 2009-232124 | 10/2009 |
| JP | 2010-109488 | 5/2010 |

(Continued)

OTHER PUBLICATIONS

3GPP TS 36.311 version 9.5.0 Release 9, Jan. 2011.*

(Continued)

*Primary Examiner* — Melvin Marcelo
*Assistant Examiner* — Peter Solinsky
(74) *Attorney, Agent, or Firm* — Katten Muchin Rosenman LLP

(57) ABSTRACT

A transmission station includes a communication section configured to perform transmission and reception of data with a receiving station by using a plurality of wireless carriers whose frequency bands differ from one another, and a processor configured to obtain reception qualities of a plurality of wireless carriers which are reported from the receiving station, and configured to assign a gap for each of the wireless carriers, in accordance with the obtained reception quality of the each of the wireless carriers, the gap being a period over which transmission of the data is stopped.

13 Claims, 26 Drawing Sheets

(56) References Cited

U.S. PATENT DOCUMENTS

| | | | |
|---|---|---|---|
| 2011/0151876 A1* | 6/2011 | Ishii et al. | 455/437 |
| 2011/0243047 A1* | 10/2011 | Dayal et al. | 370/311 |
| 2011/0317635 A1* | 12/2011 | Swaminathan | 370/329 |
| 2012/0051329 A1 | 3/2012 | Hirano et al. | |
| 2012/0113794 A1* | 5/2012 | Roman et al. | 370/201 |
| 2012/0164979 A1* | 6/2012 | Bachmann et al. | 455/411 |
| 2012/0213107 A1* | 8/2012 | Jang et al. | 370/252 |
| 2012/0263054 A1* | 10/2012 | Kazmi et al. | 370/252 |
| 2012/0294184 A1* | 11/2012 | Jung et al. | 370/252 |
| 2012/0307670 A1* | 12/2012 | Kazmi et al. | 370/252 |
| 2013/0003584 A1* | 1/2013 | Alriksson et al. | 370/252 |
| 2013/0028126 A1* | 1/2013 | Kazmi | 370/252 |
| 2013/0051214 A1* | 2/2013 | Fong et al. | 370/216 |
| 2013/0122840 A1* | 5/2013 | Jung et al. | 455/226.1 |
| 2013/0279380 A1* | 10/2013 | Hong et al. | 370/310 |
| 2013/0279524 A1* | 10/2013 | Guo et al. | 370/474 |
| 2013/0287044 A1* | 10/2013 | Ho et al. | 370/474 |
| 2013/0301629 A1* | 11/2013 | Sugaya | 370/338 |
| 2014/0185484 A1* | 7/2014 | Kim et al. | 370/252 |

FOREIGN PATENT DOCUMENTS

| | | |
|---|---|---|
| JP | 2010-154399 | 7/2010 |
| WO | 2007/080976 | 7/2007 |
| WO | 2008/043560 | 4/2008 |
| WO | 2010/109764 | 9/2010 |
| WO | 2010/140846 | 12/2010 |

OTHER PUBLICATIONS

Office Action dated Dec. 24, 2014 from the corresponding Japanese Patent Application No. 2011-057287, with Partial Translation.

* cited by examiner

FIG. 18

| LEVEL RELATIONSHIP AMONG RECEPTION QUALITIES OF CCs | OCCUPATION RATIO OF GAP | |
|---|---|---|
| | CC#1 | CC#2 |
| $\gamma_1 < \gamma_2$ | $\alpha$ | $\beta$ |
| $\gamma_1 = \gamma_2$ | 1 | 1 |
| $\gamma_1 > \gamma_2$ | $\beta$ | $\alpha$ |

FIG. 25

| CC NUMBER | CC#3 | CC#1 | CC#4 | CC#2 |
|---|---|---|---|---|
| NUMBER OF MEASURED FREQUENCIES | $N_{freq}$ | $N_{freq}$ | 1 | 0 |

TRANSMISSION STATION, RECEIVING STATION, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2011-057287, filed on Mar. 15, 2011, the entire contents of which are incorporated herein by reference.

FIELD

The embodiments discussed herein are related to a transmission station, a receiving station, a wireless communication system, and a wireless communication method.

BACKGROUND

In LTE-A (Long Term Evolution-Advanced) for which progress is being made in the standardization thereof, carrier aggregation (CA) has been proposed as a technology capable of transmitting data of a large size. In CA, a base station, which is a transmission station, and a mobile station, which is a receiving station, transmit and receive data by using a plurality of wireless carriers whose frequency bands differ from one another, the wireless carriers being called component carriers (CCs).

Furthermore, in LTE-A, when transmission and reception of data are to be performed using CA, it has been proposed that a transmission station assigns, for each CC, a gap (measurement gap), which is a period during which the transmission of data are stopped. When a gap is assigned for each CC, the receiving station sets the gap to each CC, switches the frequencies in the gap, and performs the measurement of the reception quality of the frequency after the switching.

SUMMARY

According to an aspect of the embodiments discussed herein invention, a transmission station includes a communication section configured to perform transmission and reception of data with a receiving station by using a plurality of wireless carriers whose frequency bands differ from one another, and a processor configured to obtain reception qualities of a plurality of wireless carriers which are reported from the receiving station, and configured to assign a gap for each of the wireless carriers, in accordance with the obtained reception quality of the each of the wireless carriers, the gap being a period over which transmission of the data is stopped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 illustrates an example of a correspondence table;

FIG. 25 illustrates an example of numbers of measured frequencies, which are set for CCs by the gap assignment unit.

DESCRIPTION OF EMBODIMENTS

A description will be given below, with reference to the drawings, of embodiments discussed herein of a transmission station, a receiving station, a wireless communication system, and a wireless communication method.

First Embodiment

In 3rd generation partnership project (3GPP), discussion about LTE-A as a developed form of LTE has been made. In LTE-A, in order that high-speed communication is realized, a technology has been introduced in which a plurality of wireless carriers whose frequency bands differ from one another are aggregated, and data of a large size is transmitted by using this aggregated band. This is referred to as carrier aggregation (CA).

Figure 1:
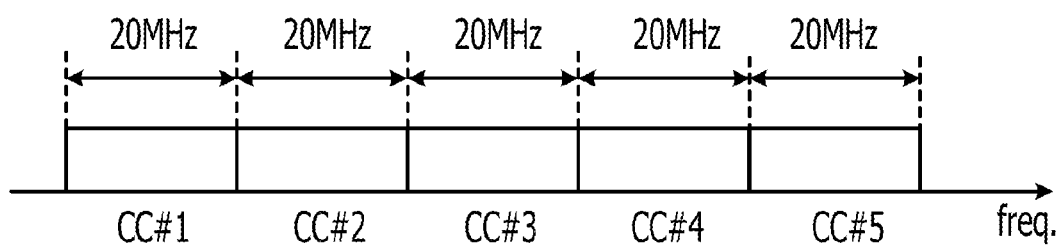
FIG. 1 illustrates an example of CA.
Figure 2:
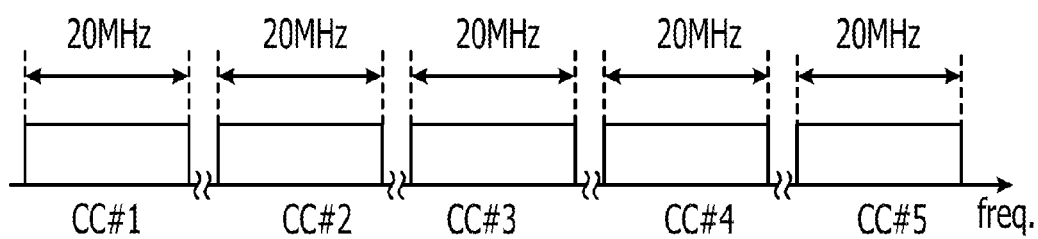
FIG. 2 illustrates an example of CA due to non-consecutive CCs.

FIG. 1 illustrates an example of CA. In FIG. 1, each wireless carrier that is aggregated is referred to as a component carrier (CC). In CA, for example, the transmission station and the receiving station perform transmission and reception of data by using a plurality of CCs. Here, as an example, a case in which communication is performed using five CCs (CC#1 to CC#5) of a bandwidth of 20 MHz is described. In FIG. 1, a case in which communication is performed using CCs of consecutive frequency bands has been described. Alternatively, in CA, for example, as illustrated in FIG. 2, communication may also be performed using CCs of non-consecutive frequency bands. FIG. 2 illustrates an example of CA using non-consecutive CCs.

Furthermore, in a communication system that performs transmission and reception of data using CA, the base station assigns, for each CC, a gap (measurement gap), which is a period during which the transmission and reception of data are stopped.

Figure 3:
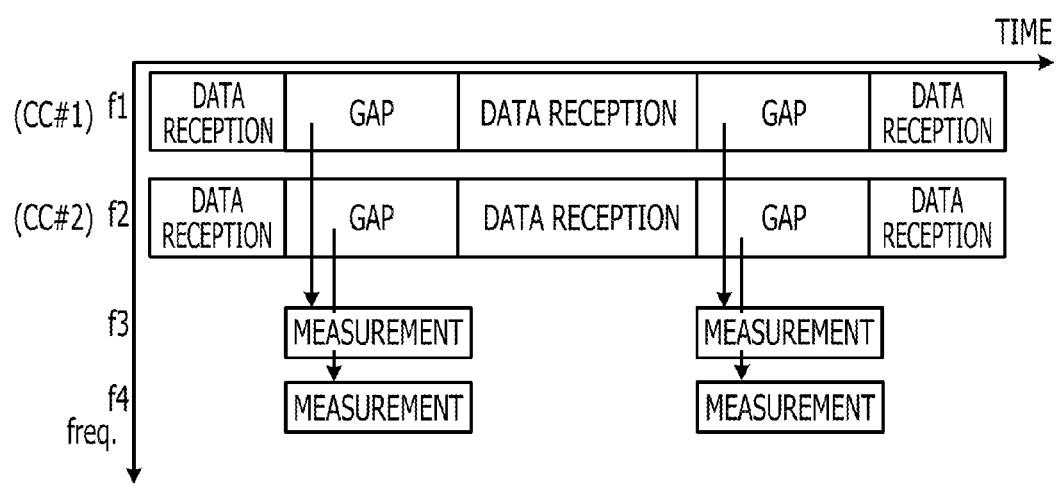
FIG. 3 illustrates an example of a gap that is assigned for each CC.

FIG. 3 illustrates an example of a gap that is assigned for each CC. As illustrated in FIG. 3, when a gap is assigned for each CC, the receiving station sets a gap to each CC, switches the frequencies in the set gap, and performs the measurement of the reception quality of the frequency after the switching. Here, as an example, a case is described in which, when communication is performed by using two CCs (CC#1, CC#2) having different frequencies, two gaps having the same cyclic period and the same time width are assigned to each CC. When such a gap as illustrated in FIG. 3 is assigned, the receiving station sets a gap to each CC, switches frequencies from f1 and f2 to f3 and f4 respectively in the gaps that are set to the corresponding CCs, and performs measurement of the reception quality of the frequency after the switching.

Figure 4:
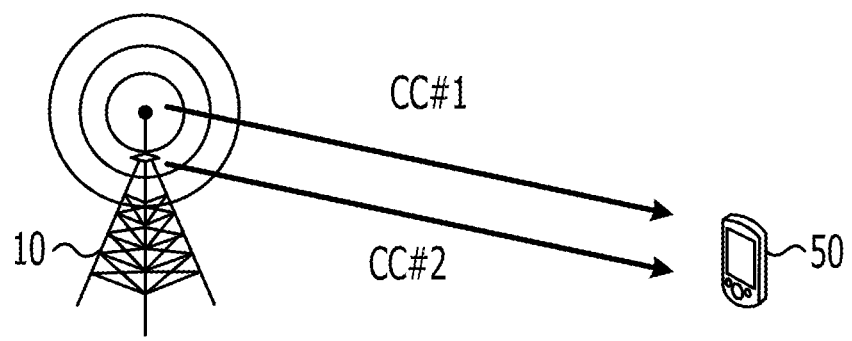
FIG. 4 illustrates an exemplary configuration of a communication system of a first embodiment.

Next, a description will be given of the communication system of a first embodiment, which performs the transmission and reception of data by using CA. FIG. 4 illustrates an exemplary configuration of a communication system of the first embodiment. As illustrated in FIG. 4, the communication system includes a base station 10 and a mobile device 50. The base station 10 is an example of a transmission station, and the mobile device 50 is an example of a receiving station. The base station 10 and the mobile device 50 perform the transmission and reception of data by using a plurality of CCs (CC#1, CC#2) having different frequency bands. The base station 10 transmits data to CC#1 and CC#2. The mobile device 50 includes a mobile terminal and receives data from CC#1 and CC#2. Furthermore, the base station 10 assigns a gap to each CC. In FIG. 4, a case is described in which the base station 10 and the mobile device 50 perform transmission and reception of data by using two CCs. Not limited to this, a case is also possible in which transmission and reception of data are performed by using three or more CCs.

Here, before describing a gap assignment method in the base station 10 included in the communication system of the present first embodiment, a gap assignment method of the related art, which is presupposed in the first embodiment, will be described.

Figure 5:
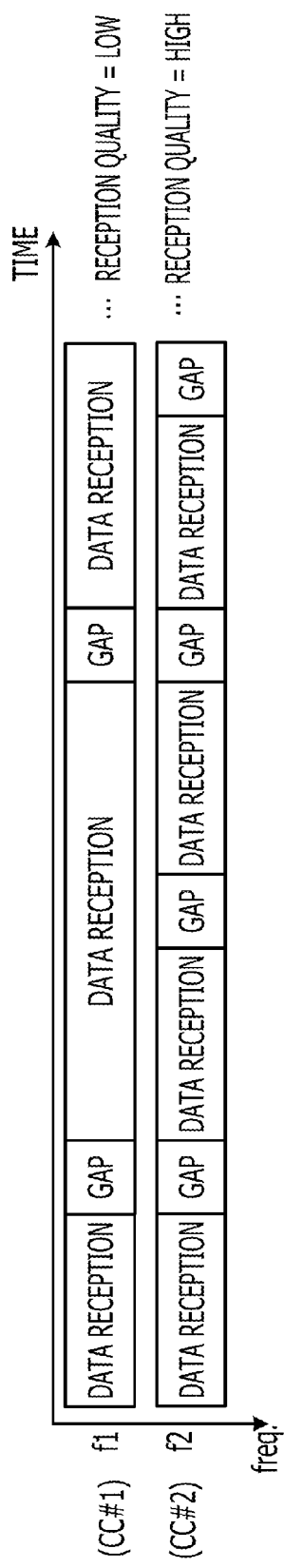
FIG. 5 illustrates an example of a gap assignment method of the related art in the CA.

FIG. 5 illustrates an example of a gap assignment method of the related art in CA. In the example illustrated in FIG. 5, a case is illustrated in which reception qualities of CCs on the mobile device side, which is a receiving station, differ from one another due to a change in the wireless environment, and it is assumed that the reception quality of CC#1 is worse than the reception quality of CC#2. In the communication system of the related art, which performs the transmission and reception of data by using CA, the cyclic period and the time width of a gap that is assigned to each CC are prespecified, and the base station, which is a transmission station, assigns a prespecified gap whose cyclic period and time width have been prespecified, to individual CCs. For this reason, like the example illustrated in FIG. 5, even when the reception qualities of the CCs on the mobile device side, which is a receiving station, differ from one another due to a change in the wireless environment, the cyclic period and the time width of the gap assigned to each CC are maintained to be fixed. Therefore, there is a probability that many gaps are assigned per certain time period to CC#2 having high reception quality better than CC#1 having low reception quality. As described above, when many gaps are assigned to a CC having high reception quality, there is a probability that the transmission of data using a CC having high reception quality is slowed down due to a gap, and the transmission rate of the data decreases.

Accordingly, in the present embodiment, by devising processing regarding the alignment of gaps, such problems as those illustrated in FIG. 5 above are avoided.

Figure 6:
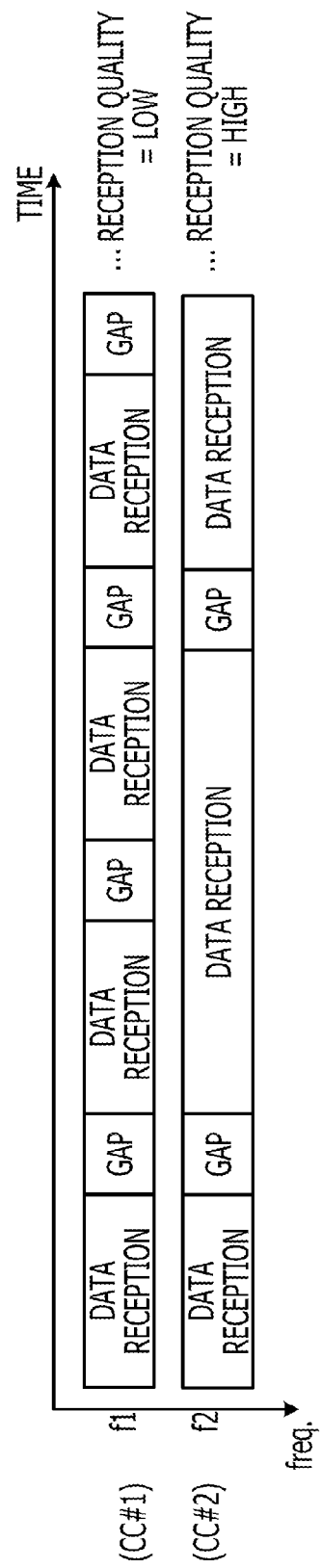
FIG. 6 illustrates a gap assignment method in a base station included in the communication system of the first embodiment.

Next, a description will be given of a gap assignment method in the base station 10 included in the communication system of the present embodiment. FIG. 6 illustrates a gap assignment method in the base station 10 included in the communication system of the first embodiment. In the example illustrated in FIG. 6, a case is illustrated in which, similarly to the example illustrated in FIG. 5, the reception qualities of the CCs differ from one another due to a change in the wireless environment. It is assumed that the reception quality of CC#1 is worse than the reception quality of CC#2. In the gap assignment method of the present embodiment, first, the base station 10 obtains the reception quality of each CC, which is reported from the mobile device 50 that performs the transmission and reception of data to and from the base station 10 by using CC#1 and CC#2. Then, the base station 10 assigns a gap to each CC in accordance with the obtained reception quality of each CC. Here, the reception quality of CC#1 is worse than the reception quality of CC#2. For this reason, the base station 10 assigns a larger number of gaps per certain time period to CC#1 having reception quality that is worse than that of CC#2 having high reception quality. In the example illustrated in FIG. 6, the base station assigns two gaps per certain time period to CC#2 having high reception quality and assigns four gaps per certain time period to CC#1 having low reception quality.

As described above, in the gap assignment method, the base station 10 assigns a gap to each CC in accordance with the reception quality of each CC, which is reported from the mobile device 50. For this reason, in the gap assignment method in the present embodiment, it is possible to assign a gap with a higher priority to a CC having a relatively reception quality worse than a CC having a relatively high reception quality. As a result, since a larger number of pieces of data may be transmitted by using a CC having high reception quality, it is possible to improve the transmission rate of data as the whole of the wireless communication network system.

Figure 7:
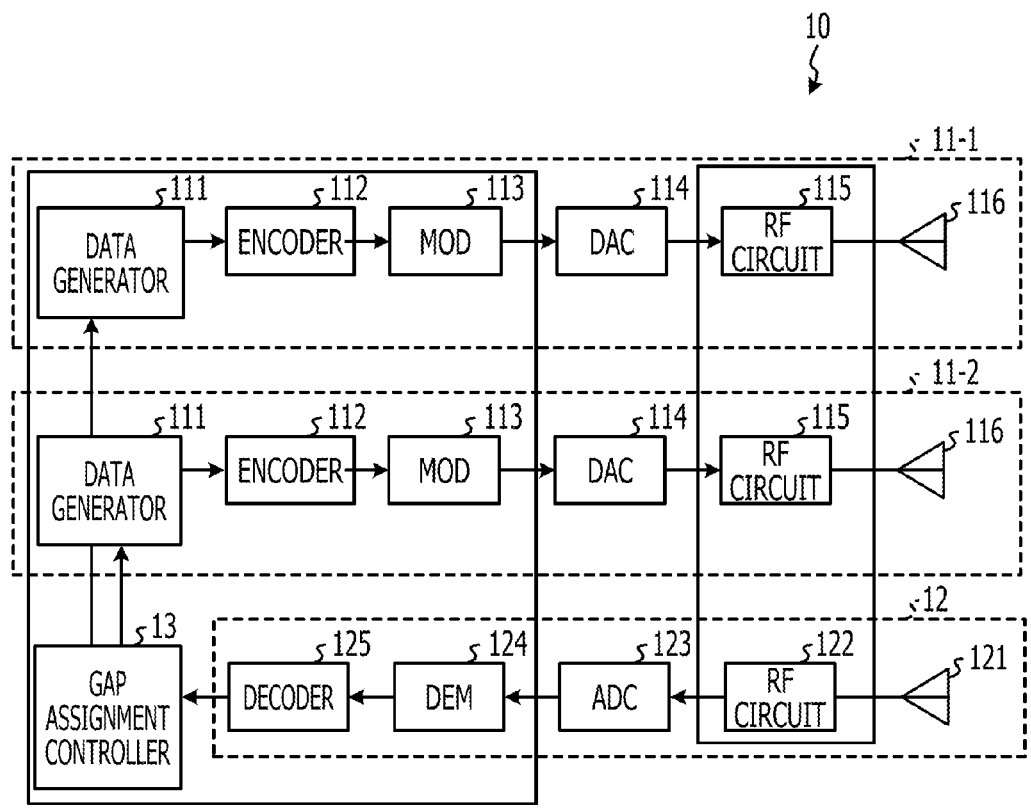
FIG. 7 illustrates an exemplary configuration of the base station in the communication system.

Next, the configuration of the communication system illustrated in FIG. 4 will be described. FIG. 7 illustrates an exemplary configuration of the base station 10 in the communication system. As illustrated in FIG. 7, the base station 10 includes data transmission sections 11-1 and 11-2, a data receiving section 12, and a gap assignment controller 13. The data transmission sections and the data receiving section may be examples of a communication section.

The data transmission sections 11-1 and 11-2 transmit data to their corresponding CCs. The data transmission sections 11-1 and 11-2 each include a data generator 111, an encoder 112, a modulator (MOD) 113, a digital to analog converter (DAC) 114, an radio frequency (RF) circuit 115, and an antenna 116. The data generator 111 generates data including assignment information that defines a gap that has been assigned to each CC by the gap assignment controller 13 (to be described later). The encoder 112 applies error correction codes, such as Turbo codes, to the generated data. The MOD 113 individually modulates the data of each CC by using a modulation method, such as quadrature phase shift keying (QPSK) or quadrature amplitude modulation (16QAM). When orthogonal frequency division multiplexing (OFDM) transmission is to be performed, the MOD 113 performs an inverse high-speed Fourier transform of transforming a signal of a frequency domain into a signal of a time domain, and appends a cyclic prefix (CP) to the signal after the inverse high-speed Fourier transform. The DAC 114 converts a digital signal into an analog signal. The RF circuit 115 upconverts the received signal into a wireless frequency band. The antenna 116 transmits the upconverted signal to the mobile device 50.

The data receiving section 12 receives the data transmitted by the mobile device 50 from each CC. The data receiving section 12 includes an RF circuit 122, an analog to digital converter (ADC) 123, a demodulator (DEM) 124, and a decoder 125. The antenna 121 receives a signal that is transmitted by the mobile device 50 for each CC. The RF circuit 122 down-converts the received signal into a base band. The ADC 123 converts the analog signal into a digital signal. The DEM 124 individually demodulates the data of each CC from the signal modulated using a modulation method QPSK or 16QAM. When OFDM transmission is to be performed, the DEM 124 removes the CP from the received signal, and performs a high-speed Fourier transform of transforming the signal in the time domain into a signal in the frequency domain. The decoder 125 decodes error correction code, such as Turbo code, from the received data. The data after decoding is handed over to the gap assignment controller 13 for each CC.

Figure 8:
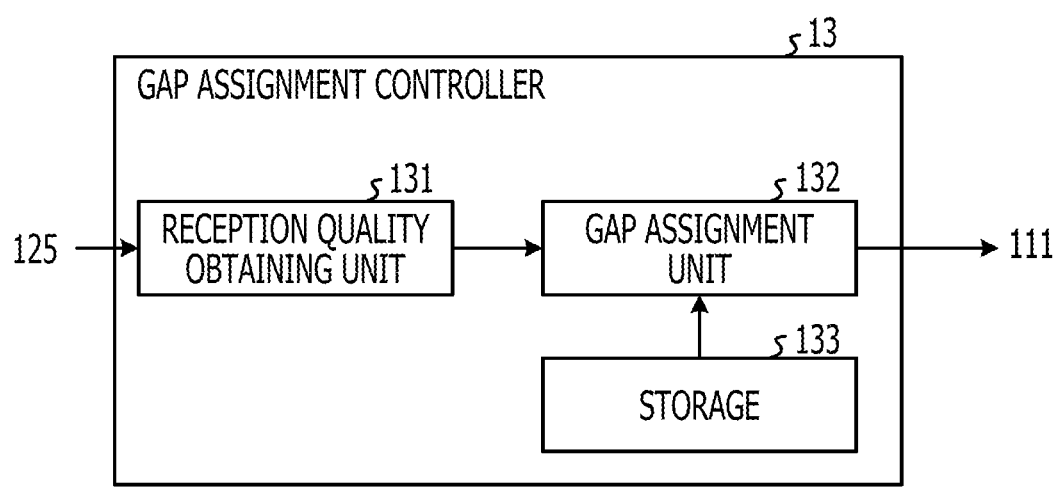
FIG. 8 illustrates an exemplary configuration of a gap assignment controller.

The gap assignment controller 13 controls the assignment of the gap with respect to each CC based on the information fed back from the mobile device 50. FIG. 8 illustrates an exemplary configuration of the gap assignment controller 13. As illustrated in FIG. 8, the gap assignment controller 13 includes a reception quality obtaining unit 131, a gap assignment unit 132, and a storage 133.

The reception quality obtaining unit 131 obtains the reception quality of each CC, which is reported from the mobile device 50. More specifically, the reception quality obtaining unit 131 periodically extracts a signal power to interference and noise power ratio (SINR) of each CC, which is reported from the mobile device 50, from the data received from the decoder 125. Then, the reception quality obtaining unit 131 obtains the average value of N SINRs extracted within a certain time period in each CC in accordance with Equation (1) below. Then, the reception quality obtaining unit 131 obtains the average value of the SINRs of each CC as the reception quality of each CC.

$$\bar{\gamma}_i = \frac{1}{N} \sum_{k=1}^{N} \gamma_i(k) \qquad (1)$$

where $\bar{\gamma}_i$: average value of SINR of CC#i
$\gamma_i(k)$: SINR of CC#i Here, an example is described in which the reception quality obtaining unit 131 obtains the average value of the SINRs of each CC. Alternatively, a forgetting average value of the SINRs extracted in each CC may be obtained. In this case, the reception quality obtaining unit 131 obtains the forgetting average value of the SINRs that are extracted in each CC in accordance with Equation (2) below. Then, the reception quality obtaining unit 131 obtains the forgetting average value of the SINRs of each CC as the reception quality of each CC.

$$\gamma_i = (1-\lambda)\bar{\gamma}_i + \lambda\gamma_i \qquad (2)$$

where $\lambda$: forgetting factor, $0 < \lambda \leq 1$

Furthermore, the reception quality obtaining unit 131 obtains the SINR of each CC, which is reported from the mobile device 50, as an example of the reception quality. Alternatively, the reception quality obtaining unit 131 may obtain another parameter defined in the 3GPP as the reception quality in place of the SINR. Examples of other parameters that are defined in the 3GPP include a channel quality indicator (CQI), a reference signal received quality (RSRQ), and a channel capacity, which are defined in the 3GPP. CQI is an indicator that is periodically reported from the receiving station to the transmission station when data communication is performed, and indicates a modulation method and a coding rate used for data communication. RSRQ is the ratio of the desired signal to the received power of the receiving station. The channel capacity is the parameter $C_i$ that is calculated in accordance with Equation (3) below.

$$C_i = B_i \log_2(1+\gamma_i) \qquad (3)$$

where $B_i$: band width of CC#i
$\gamma_i$: SINR of CC#i

The gap assignment unit 132 assigns a gap to each CC in accordance with the reception quality of each CC, which is obtained by the reception quality obtaining unit 131. More specifically, the gap assignment unit 132 assigns a gap to a CC having low reception quality with a higher priority by using the storage 133. Furthermore, the gap assignment unit 132 transmits the assignment information, which is information that defines the gap assigned for each CC, to the mobile device 50 through the data transmission sections 11-1 and 11-2. The assignment process of a gap, which is performed by the gap assignment unit 132 by using the storage 133, will be described later.

Figure 9:
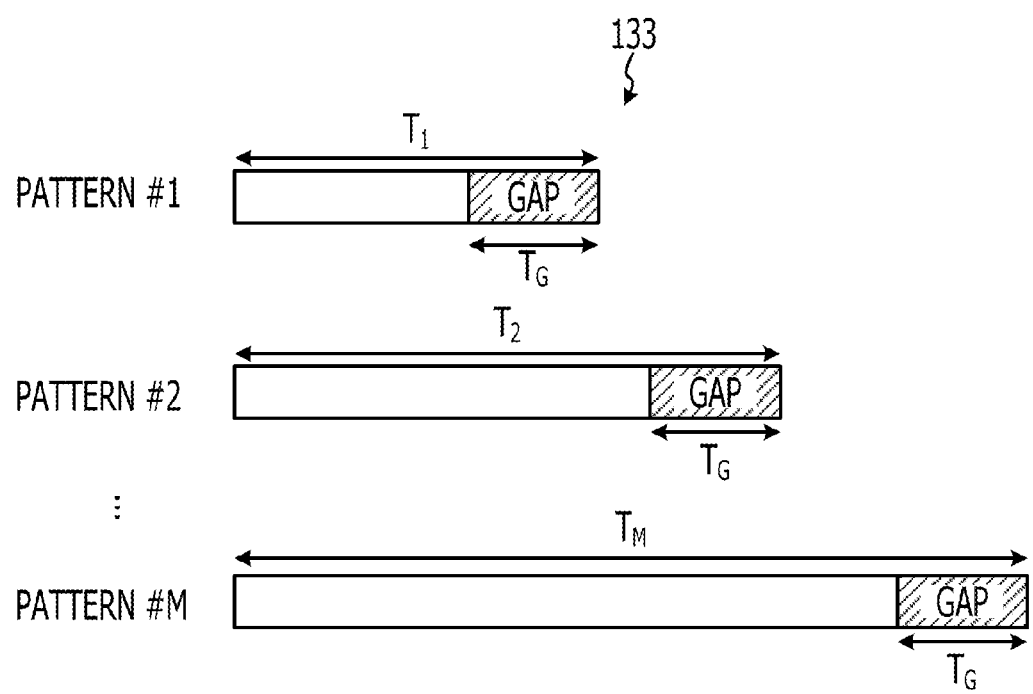
FIG. 9 illustrates an example of a storage.

The storage (memory) 133 prestores patterns of a plurality of gaps having different cyclic periods. An example of the storage 133 is illustrated in FIG. 9. The storage 133 illustrated in FIG. 9 stores patterns #1 to #M of a plurality of gaps. The cyclic periods $T_1$ to $T_M$ of the patterns #1 to #M of gaps differ from one another. The time widths $T_G$ of the patterns #1 to #M of the gap are the same as each other.

Figure 10:
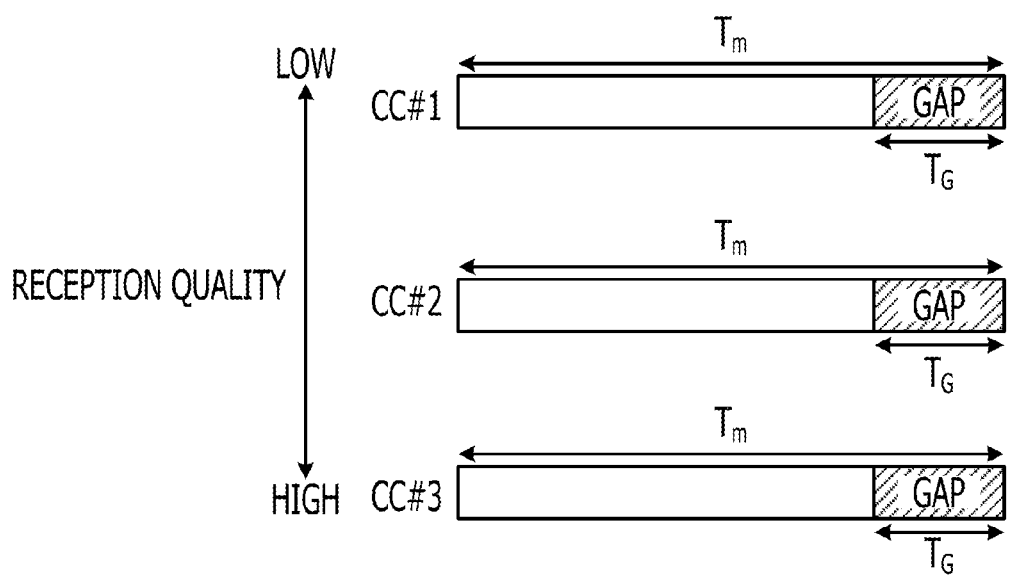
FIG. 10 illustrates an example of a case in which it is assumed that patterns of gaps having the same cyclic periods are assigned to CCs.

Here, a description will be given of a gap assignment process performed by the gap assignment unit 132 using the storage 133. FIG. 10 illustrates an example of a case in which it is assumed that patterns of gaps having the same cyclic periods are individually assigned to the CCs. Each of CC#1 to CC#3 illustrated in FIG. 10 is assigned with one gap within a certain time period $T_m$. First, the gap assignment unit 132 in the present embodiment sequentially sorts CC#1 to CC#3 in descending order of reception quality obtained by the reception quality obtaining unit 131. It is assumed here that the reception quality decreases in the order of CC#1 to CC#3 and that the gap assignment unit 132 has sequentially sorted CC#1 to CC#3 in this order.

Next, the gap assignment unit 132 calculates the cyclic period $t_I$ of the gap that is assigned to a CC having the lowest reception quality among the CCs that have been sorted in descending order of reception quality. More specifically, the gap assignment unit 132 calculates, in accordance with Equation (4) below, the cyclic period $t_I$ of the gap having the lowest reception quality among the CCs that have been sorted in descending order of reception quality. It is assumed here that the gap assignment unit 132 has calculated the cyclic period $t_1=T_m/3$ of the gap that is assigned to CC#1 having the lowest reception quality among CC#1 to CC#3 that have been sequentially sorted in descending order of reception quality.

$$t_1 = \frac{1}{\frac{N_{CC}}{T_m} - \sum_{j=1}^{i-1} \frac{1}{t_j}} \quad (4)$$

where $N_{CC}$: total number of CCs $T_m$: certain time period

Figure 11:
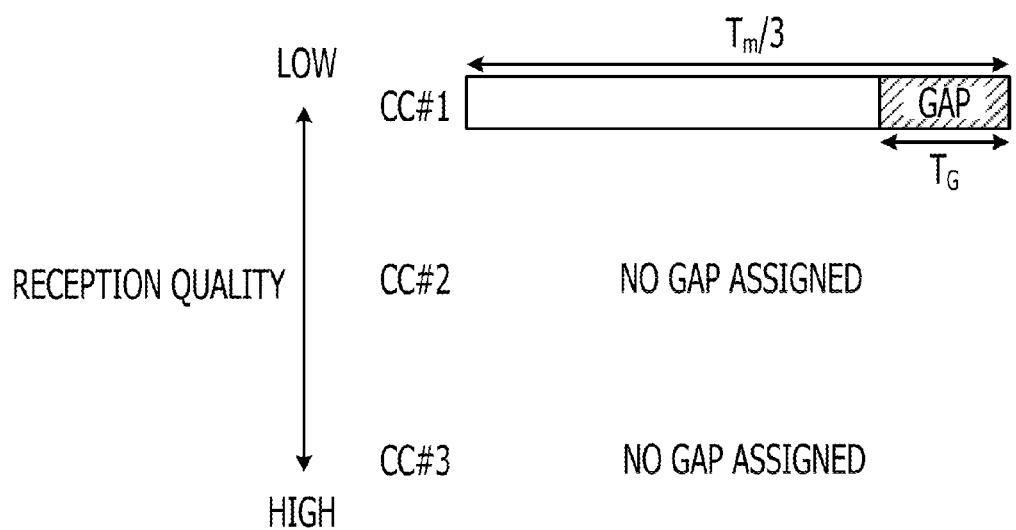
FIG. 11 illustrates an example of a gap that is assigned to a CC having the lowest reception quality.

Next, the gap assignment unit 132 searches the patterns of a plurality of gaps stored in the storage 133 for the pattern of the gap having the calculated cyclic period $t_I$. When the pattern of the gap having the calculated cyclic period $t_I$ is retrieved from the storage 133, the gap assignment unit 132 assigns the gap having the retrieved cyclic period $t_I$ to the CC having the lowest reception quality. For example, when the pattern of the gap having the calculated cyclic period $t_1=T_m/3$ is retrieved from the storage 133, as illustrated in FIG. 11, the gap assignment unit 132 assigns the gap having the cyclic period $t_1=T_m/3$ to CC#1 having the lowest reception quality. As a result, three gaps are assigned to CC#1 during the certain time period $T_m$, and the occupation ratio of the gap, which is approximately the same degree as in the case illustrated in FIG. 10, is maintained. FIG. 11 illustrates an example of a gap that is assigned to the CC having the lowest reception quality.

Figure 12:
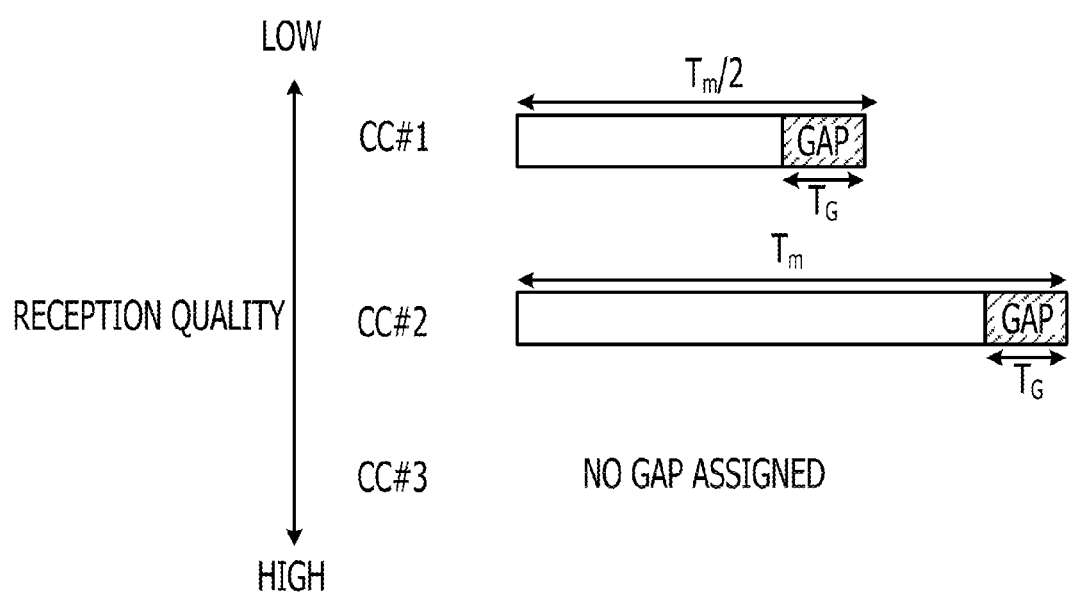
FIG. 12 illustrates an example of a gap that is assigned to a CC having the lowest reception quality and a CC having the second lowest reception quality.

On the other hand, when the pattern of the gap having the calculated cyclic period $t_I$ is difficult to be retrieved from the storage 133, the gap assignment unit 132 selects the pattern of the gap having the shortest cyclic period from the storage 133, and assigns it to the CC having the lowest reception quality. For example, when the pattern of the gap having the calculated cyclic period $t_1=T_m/3$ is difficult to be retrieved, as illustrated in FIG. 12, the gap assignment unit 132 selects the gap having the shortest cyclic period $T_1=T_m/2$ from the storage 133, and assigns it to CC#1 having the lowest reception quality.

Then, when the pattern of the gap having the shortest cyclic period is selected from the storage 133, the gap assignment unit 132 calculates the cyclic period $t_I$ of the gap that is assigned to CC having the second lowest reception quality among the CCs that have been sequentially sorted in descending order of reception quality. More specifically, the gap assignment unit 132 calculates, in accordance with Equation (4) above, the cyclic period $t_I$ of the gap that is assigned to the CC having the second lowest reception quality among the CCs that have been sequentially sorted in descending order of reception quality. It is assumed here that the gap assignment unit 132 has calculated the cyclic period $t_2=T_m$ of the gap that is assigned to CC#2 having the second lowest reception quality among CC#1 to CC#3 that have been sequentially sorted in descending order of reception quality.

Next, the gap assignment unit 132 searches the plurality of patterns of gaps stored in the storage 133 for the pattern of the gap having the calculated cyclic period $t_2$. When the pattern of the gap having the calculated cyclic period $t_2$ is retrieved from the storage 133, the gap assignment unit 132 assigns the gap having the retrieved cyclic period $t_2$ to a CC having the second lowest reception quality. For example, when the pattern of the gap having the calculated cyclic period $t_2=T_m/2$ is retrieved from the storage 133, as illustrated in FIG. 12, the gap assignment unit 132 assigns the gap having the cyclic period $t_2=T_m$ to CC#2 having the shortest cyclic period. As a result, two gaps and one gap are assigned to CC#1 and CC#2, respectively, during the certain time period $T_m$, and the occupation ratio of the gap, which is approximately the same degree as in the case illustrated in FIG. 10, is maintained. FIG. 12 illustrates an example of a gap that is assigned to the CC having the lowest reception quality and to a CC having the second lowest reception quality.

When the pattern of the gap having the calculated cyclic period is difficult to be retrieved from the storage 133, the gap assignment unit 132 selects the pattern of the having gap having the shortest cyclic period from the storage 133, and assigns it to the CC having the second lowest reception quality. Then, the gap assignment unit 132 repeats the above-described series of processing until the pattern of the gap having the calculated cyclic period is retrieved from the storage 133 or until a gap is assigned to all the CCs that have been sequentially sorted in descending order of reception quality.

As described above, the gap assignment unit 132 selects, from the storage 133, the patterns of the gaps such that the lower the reception quality of the CC is, the shorter the cyclic period is, which is obtained by the reception quality obtaining unit 131, and assigns the gaps to the CCs. As a result, a gap is assigned with a higher priority to a CC having relatively low reception quality, and the occupation ratio per certain time period of the gap in the CC whose reception quality is relatively high is suppressed.

Here, an example is described in which the storage 133 prestores patterns of a plurality of gaps having different cyclic periods. Alternatively, the storage 133 may prestore patterns of a plurality of gaps having different time widths. In this case, the gap assignment unit 132 selects, from the storage 133, the pattern of the gap such that the lower the reception quality of each CC, which has been obtained by the reception quality obtaining unit 131, the larger the time width is, and assigns the gap to each CC. As a result, the gap is assigned with a higher priority to a CC having relatively low reception quality, and the occupation ratio per certain time period of the gap in the CC having relatively high reception quality is suppressed.

In the base station 10, the RF circuits 115 and 122 are constituted by analog circuits, and the data generator 111, the encoder 112, the MOD 113, the DEM 124, the decoder 125, and the gap assignment controller 13 may be constituted by, for example, a digital circuit, a processor, such as a central processing unit (CPU), a digital signal processor (DSP), or a field programmable gate array (FPGA), a memory, and the like.

Figure 13:
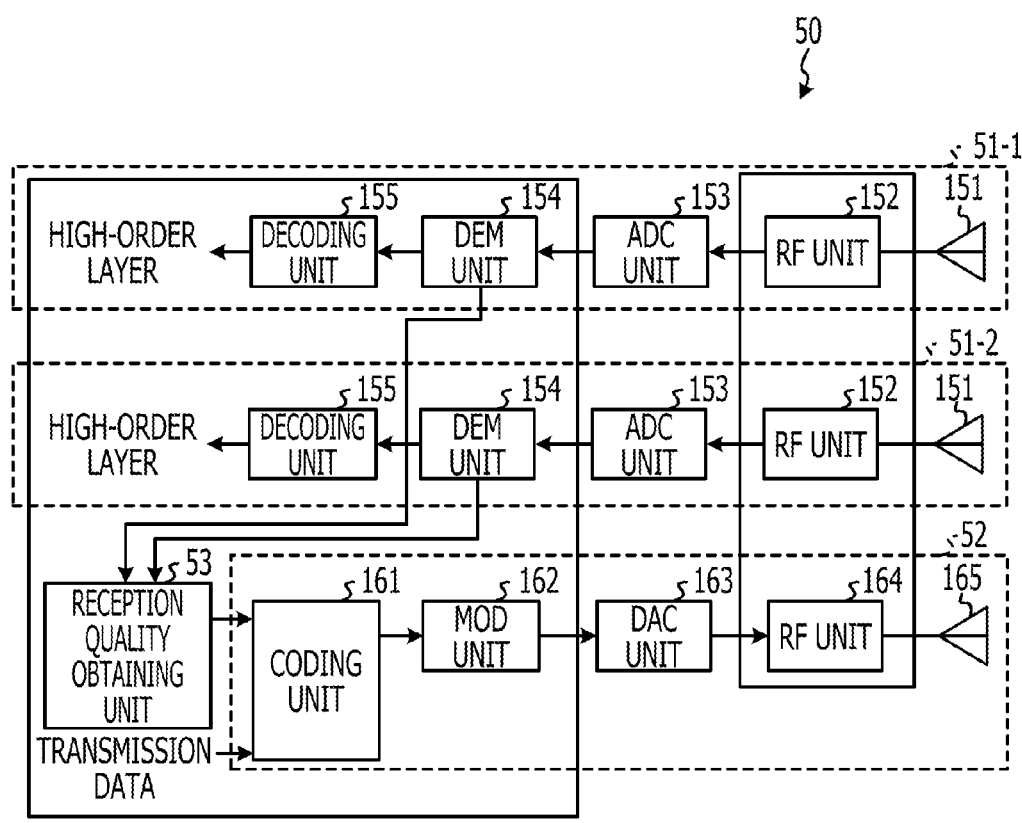
FIG. 13 illustrates an exemplary configuration of a mobile device in the communication system.

FIG. 13 illustrates an exemplary configuration of the mobile device 50 in the communication system. As illustrated in FIG. 13, the mobile device 50 includes data receiving sections 51-1 and 51-2, a data transmission section 52, and a reception quality obtaining unit 53.

The data receiving sections 51-1 and 51-2 each receive data from their corresponding CC. The data receiving sections 51-1 and 51-2 each include an antenna 151, an RF circuit 152, an ADC 153, a DEM 154, and a decoder 155. The antenna 151 receives a signal transmitted by the base station 10. The RF circuit 152 down-converts the received signal to a base band. The ADC 153 converts the analog signal into a digital signal. The DEM 154 demodulates the data from the signal modulated by using a modulation method, such as QPSK or 16QAM. When OFDM transmission is to be performed, the DEM 154 removes the CP from the received signal, and performs a high-speed Fourier transform of transforming the signal in the time domain into a signal in the frequency domain. The decoder 155 decodes error correction code, such as Turbo code, from the received data, and hand-overs the data after decoding to a high-order layer.

The data transmission section 52 transmits data to the base station 10 by using each CC. The data transmission section 52 includes an encoder 161, an MOD 162, a DAC 163, an RF circuit 164, and an antenna 165. The encoder 161 applies error correction codes, such as, for example, Turbo codes, to the data received from the reception quality obtaining unit 53 (to be described later) and to transmission data. The MOD 162 individually modulates the data of each CC by using a modulation method, such as QPSK or 16QAM. When OFDM transmission is to be performed, the MOD 162 performs an inverse high-speed Fourier transform of transforming a signal in the frequency domain into a signal in the time domain, and appends a CP to the signal after the inverse high-speed Fourier transform. The DAC 163 converts the digital signal into an analog signal. The RF circuit 164 upconverts the received signal to a wireless frequency band. The antenna 165 transmits the signal after the up-conversion to the base station 10 by using each CC.

The reception quality obtaining unit 53 extracts a pilot signal that is a known signal from the signal demodulated by the DEM 154, and measures the reception quality of each CC based on a pilot signal after the extraction. For example, the reception quality obtaining unit 53 measures the SINR as the reception quality of each CC.

The mobile device 50 extracts assignment information that defines the gap from the output signal of the decoder 155, and performs gap setting of each CC. Then, the mobile device 50 changes the present frequency to another frequency in the gap that has been set in each CC, measures the reception quality of the other frequency, and hand-overs it to a cell corresponding to the other frequency when the reception quality of the other frequency is better than the reception quality of the current frequency.

In the mobile device 50, the RF circuits 152 and 164 may be constituted by analog circuits, and the reception quality obtaining unit 53, the DEM 154, the decoder 155, the encoder 161, and the MOD 162 may be constituted by, for example, a digital circuit, a processor such as a CPU, a DSP, or an FPGA, a memory, and the like.

Figure 14:
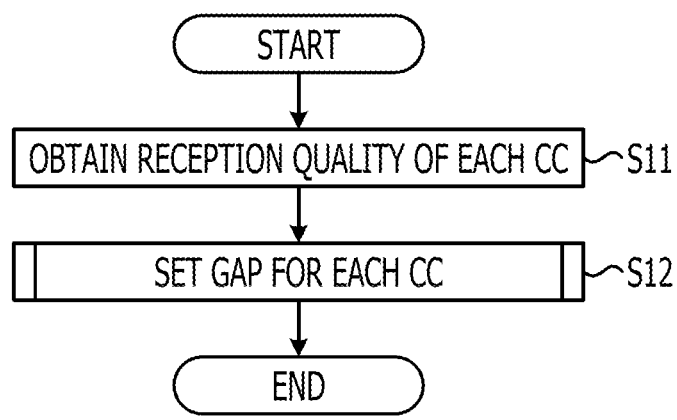
FIG. 14 is a flowchart illustrating the processing procedure of a gap assignment process performed by the base station according to the first embodiment.

Next, a description will be given of the processing procedure of a gap assignment process performed by the base station 10 according to a first embodiment. FIG. 14 is a flowchart illustrating the processing procedure of a gap assignment process performed by the base station 10 according to the first embodiment.

As illustrated in FIG. 14, in the base station 10, first, the reception quality obtaining unit 131 of the gap assignment controller 13 obtains the reception quality of each CC, which is reported from the mobile device 50 (S11). Then, the gap assignment unit 132 assigns a gap to each CC in accordance with the reception quality of each CC, which is obtained by the reception quality obtaining unit 131 (S12).

Figure 15:
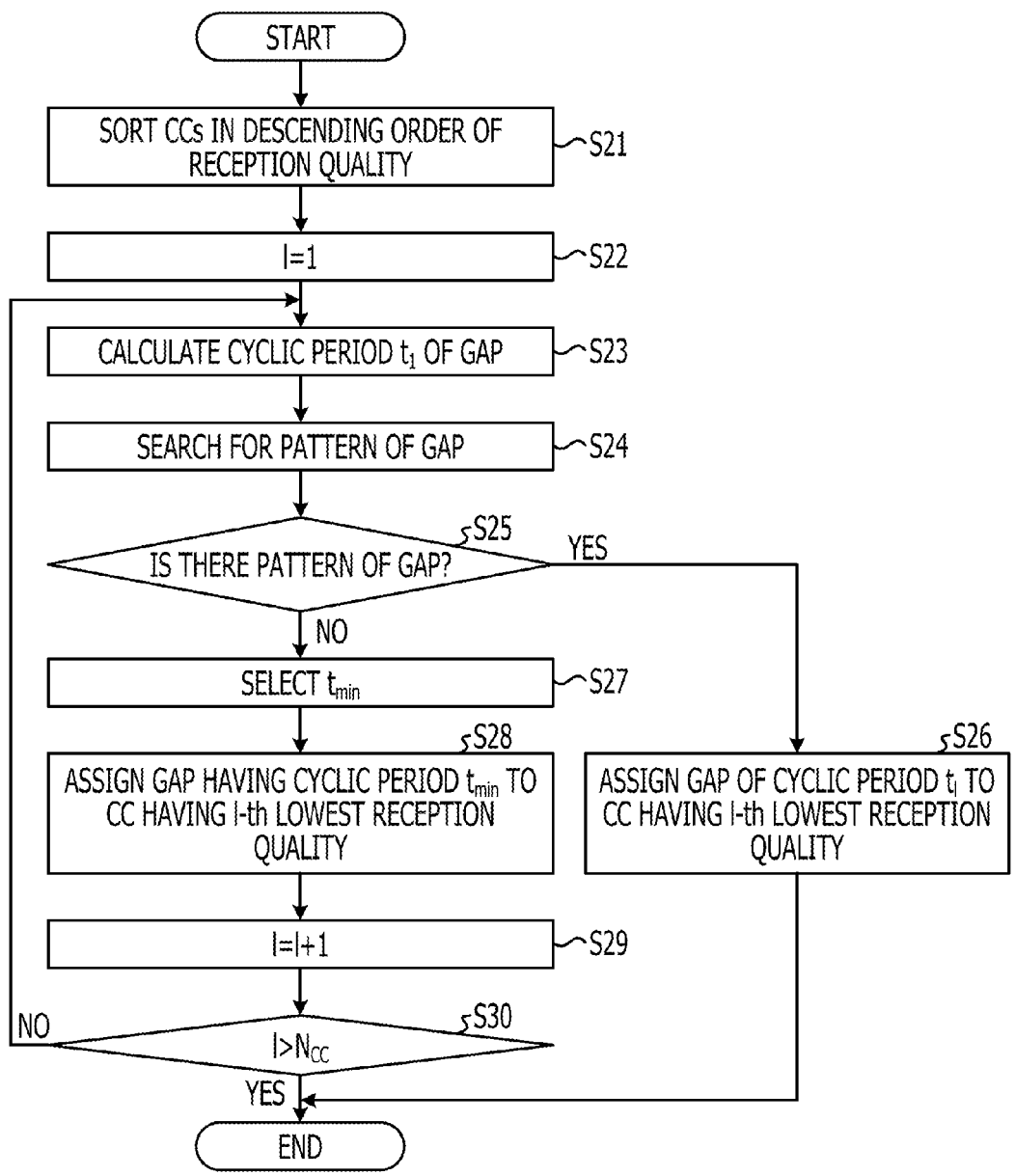
FIG. 15 is a flowchart illustrating the processing procedure of the gap assignment unit in the first embodiment.

Next, a description will be given of the processing procedure of the gap assignment unit 132 in the first embodiment. FIG. 15 is a flowchart illustrating the processing procedure of the gap assignment unit 132 in the first embodiment. The processing procedure illustrated in FIG. 15 corresponds to S12 illustrated in FIG. 14.

As illustrated in FIG. 15, first, the gap assignment unit 132 sorts the CCs in descending order of reception quality of CCs obtained by the reception quality obtaining unit 131 (S21). Then, the gap assignment unit 132 sets "1" to the parameter I indicating the order of the reception quality of each CC (S22). More specifically, the gap assignment unit 132 selects the CC having the lowest reception quality among the CCs that have been sequentially sorted in descending order of reception quality.

Next, the gap assignment unit 132 calculates the cyclic period $t_I$ of the gap that is assigned to the selected CC (S23). More specifically, the gap assignment unit 132 calculates the cyclic period of the gap that is assigned to the selected CC in accordance with Equation (4) above.

Next, the gap assignment unit 132 searches the patterns of the plurality of gaps stored in the storage 133 for the pattern of the gap having the calculated cyclic period $t_I$ (S24). When the pattern of the gap having the calculated cyclic period $t_I$ is retrieved from the storage 133 (yes in S25), the gap assignment unit 132 assigns the gap having the cyclic period $t_I$ to the CC having the lowest reception quality (S26).

On the other hand, when the pattern of the gap having the calculated cyclic period $t_I$ is difficult to be retrieved from the storage 133 (no in S25), the gap assignment unit 132 selects the pattern of the gap having the shortest cyclic period $t_{min}$ from the storage 133 (S27). Then, the gap assignment unit 132 assigns the gap having the shortest cyclic period $t_{min}$ to the CC having the lowest reception quality (S28).

Then, the gap assignment unit 132 increments I by 1 (S29). More specifically, the gap assignment unit 132 selects the CC having the second lowest reception quality among the CCs that have been sequentially sorted in descending order of reception quality. Then, when I is greater than the total number $N_{cc}$ of CCs (yes in S30), the gap assignment unit 132 ends the processing, and when I is smaller than or equal to the total number $N_{cc}$ of CCs (no in S30), the process returns to S23.

As described above, the gap assignment unit 132 selects, from the storage 133, the pattern of a gap such that the lower the reception quality of each CC obtained by the reception quality obtaining unit 131 is, the shorter the cyclic period is, and assigns the gap to each CC. As a result, the gap is assigned with a higher priority to the CC having relatively low reception quality, and the occupation ratio per certain time period of the gap in the CC having relatively high reception quality is suppressed.

As has been described above, the base station 10 according to the first embodiment assigns a gap to each CC in accordance with the reception quality of each CC, which is reported from the mobile device 50. For this reason, it is possible for the base station 10 to assign with a higher priority to the CC having relatively low reception quality worse than the CC having relatively high quality. As a result, since a larger number of pieces of data may be transmitted by using CCs having high reception quality, the transmission rate of the data as the whole of the wireless communication network system may be improved.

Furthermore, in the first embodiment, the storage 133 prestores the patterns of a plurality of gaps having different cyclic periods, and the gap assignment unit 132 selects, from the storage 133, the pattern of the short gap such that the lower the reception quality of each CC is, the shorter the cyclic period is, and assigns the gap to each CC. For this reason, it is possible for the base station 10 to obviate a process of calculating the cyclic period of the gap and to assign at high speed the gap to the CC having a low reception quality. As a result, since data may be efficiently transmitted by using CCs having a high reception quality, the transmission rate of data as the whole of the wireless communication network system may be improved.

Second Embodiment

In the first embodiment, the base station selects, from the patterns of a plurality of prestored gaps, a pattern of a gap having a short cyclic period such that the lower the reception quality of each CC is, the shorter the cyclic period is, and assigns the gap to each CC. In the second embodiment, an example is described in which the base station determines the cyclic period or the time width of the gap that is assigned to each CC within a certain time period based on the level relationship among the reception qualities of the CCs.

Figure 16:
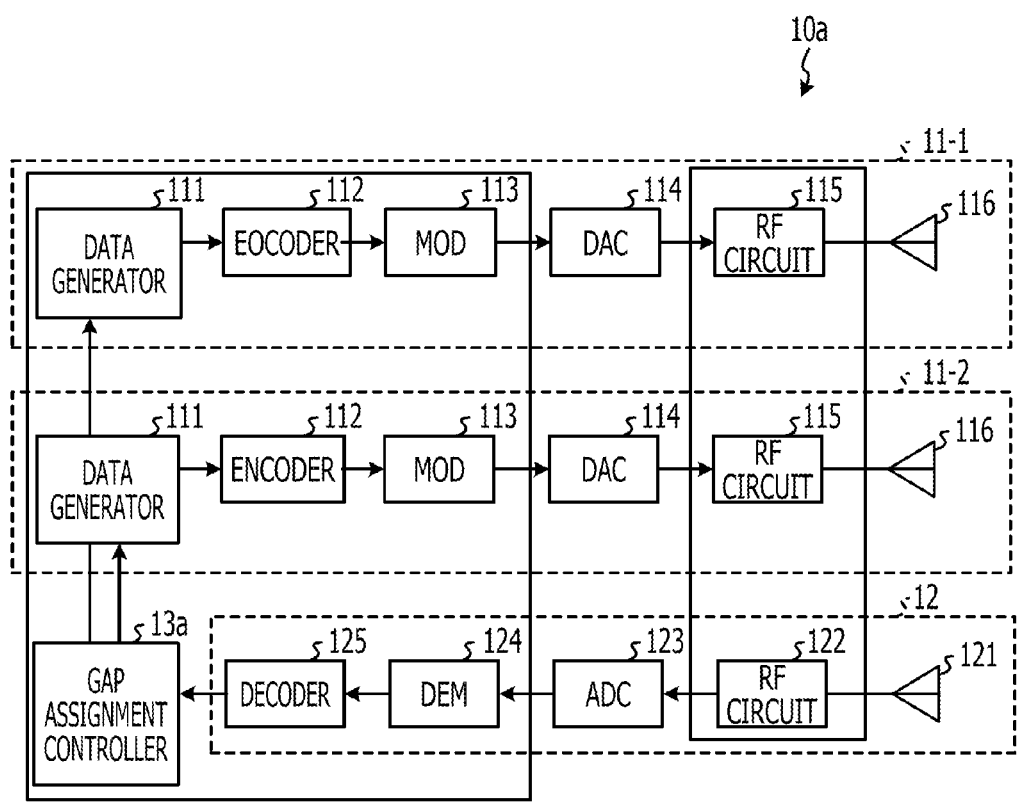
FIG. 16 illustrates an exemplary configuration of the base station in the communication system.

FIG. 16 illustrates an exemplary configuration of a base station 10a in a communication system. The exemplary configuration of a mobile device in the communication system is the same as that of the above-described first embodiment, and accordingly the description thereof is omitted here. Furthermore, components in FIG. 16, which are the same as those of the above-described first embodiment, are designated with the same reference numerals, and the descriptions thereof are omitted.

As illustrated in FIG. 16, the base station 10a includes the data transmission sections 11-1 and 11-2, the data receiving section 12, and a gap assignment controller 13a.

Figure 17:
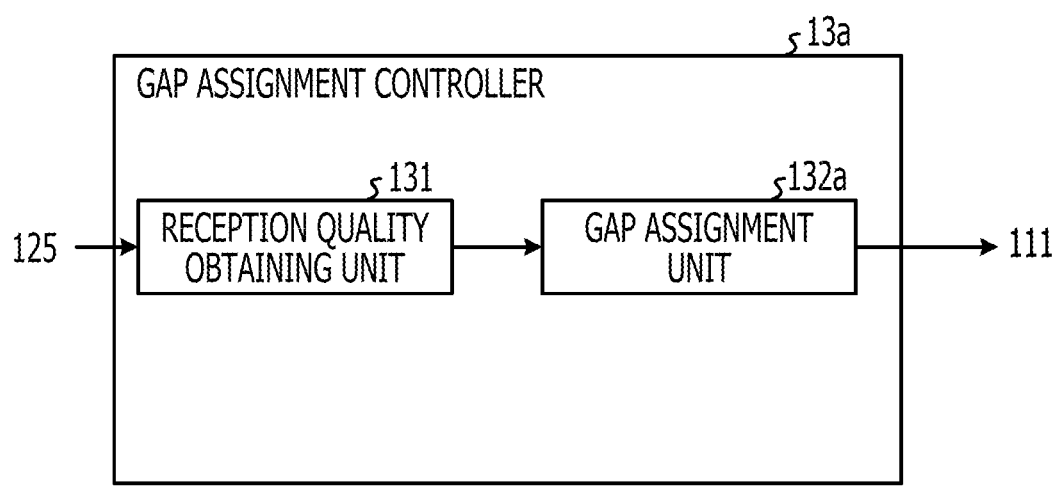
FIG. 17 illustrates an exemplary configuration of the gap assignment controller.

The gap assignment controller 13a controls the assignment of the gap to each CC based on the information fed back from the mobile device 50. FIG. 17 illustrates an exemplary configuration of the gap assignment controller 13a. The gap assignment controller 13a includes the reception quality obtaining unit 131 and a gap assignment unit 132a.

The gap assignment unit 132a determines the cyclic period of the gap that is assigned to each CC within a certain time period based on the level relationship among the reception qualities of the CCs, which are obtained by the reception quality obtaining unit 131. More specifically, the gap assignment unit 132a stores, in the internal memory, a correspondence table in which the level relationship among the reception qualities of the CCs and the occupation ratio of a gap that is assigned to each CC within a certain time period are associated with each other. In the correspondence table, the level relationship of the reception quality of each CC and the occupation ratio of the gap that is assigned to each CC within a certain time period are associated with each other so that the lower the reception quality is, the more the occupation ratio of the gap that is assigned within the certain time period increases. Then, the gap assignment unit 132a compares the levels of the reception quality of each CC, which is obtained by the reception quality obtaining unit 131, with each other. Then, the gap assignment unit 132a reads the occupation ratio of the gap corresponding to the comparison result of the level relationship among the reception qualities of the CCs by referring to the correspondence table. Then, the gap assignment unit 132a determines the cyclic period of the gap that is assigned to each CC within the certain time period by using the occupation ratio of the gap, which is read from the correspondence table. Then, the gap assignment unit 132a assigns the gap having the determined cyclic period to each CC.

FIG. 18 illustrates an example of a correspondence table. In the correspondence table illustrated in FIG. 18, the level relationship of the reception qualities of two CC (CC#1, CC#2), and the occupation ratio of the gap that is assigned to each CC within a certain time period are associated with each other. For example, when the reception quality $\gamma_1$ of CC#1 is lower than the reception quality $\gamma_2$ of CC#2, the ratio of the occupation ratio of the gap assigned to CC#1 within the certain time period to the occupation ratio of the gap assigned to CC#2 becomes $\alpha:\beta$ (where $\alpha>\beta$). When the reception quality $\gamma_1$ of CC#1 is equal to the reception quality $\gamma_2$ of CC#2, the ratio of the occupation ratio of the gap assigned to CC#1 to the occupation ratio of the gap assigned to CC#2 within the certain time period becomes 1:1. When the reception quality $\gamma_1$ of CC#1 is higher than the reception quality $\gamma_2$ of CC#2, the ratio of the occupation ratio of the gap assigned to CC#1 to the occupation ratio of the gap assigned to CC#2 within the certain time period becomes $\beta:\alpha$.

Here, an example of processing performed by the gap assignment unit 132a will be described by using the example illustrated in FIG. 18. First, the gap assignment unit 132a compares the levels of the reception qualities of CCs, which have been obtained by the reception quality obtaining unit 131. It is assumed here that the gap assignment unit 132a compares the levels of the reception qualities of two CC (CC#1 and CC#2), which have been obtained by the reception quality obtaining unit 131. Then, the gap assignment unit 132a reads the occupation ratio of the gap, which corresponds to the comparison result of the level relationship of the reception qualities of the two CCs, by referring to the correspondence table illustrated in FIG. 18. For example, when the reception quality of CC#1 is lower than the reception quality of CC#2, the gap assignment unit 132a reads the occupation ratio $\alpha$ of the gap of CC#1 and the occupation ratio $\beta$ of the gap of CC#2.

Then, the gap assignment unit 132a determines the cyclic period of the gap that is assigned to each CC within the certain time period by using the occupation ratio of the gap, which has been read from the correspondence table. For example, when the reception quality of CC#1 is lower than the reception quality of CC#2, within the certain time period T, the gap assignment unit 132a determines the cyclic period of the gap that is assigned to CC#1 to be $(\alpha+\beta)/(2\alpha)\times T$, and determines the cyclic period of the gap that is assigned to CC#2 to be $(\alpha+\beta)/(2\beta)\times T$. When the reception quality of CC#1 is equal to the reception quality of CC#2, the gap assignment unit 132a determines the cyclic period of the gap that is assigned to CC#1 and the cyclic period of gap that is assigned to CC#2 within the certain time period T to be T. When the reception quality of the CC#1 is higher than the reception quality of CC#2, the gap assignment unit 132a determines the cyclic period of the gap that is assigned to CC#1 within the certain time period T to be $(\alpha+\beta)/(2\beta)\times T$, and determines the cyclic period of the gap that is assigned to CC#2 within the certain time period T to be $(\alpha+\beta)/(2\alpha)\times T$.

Figure 19:
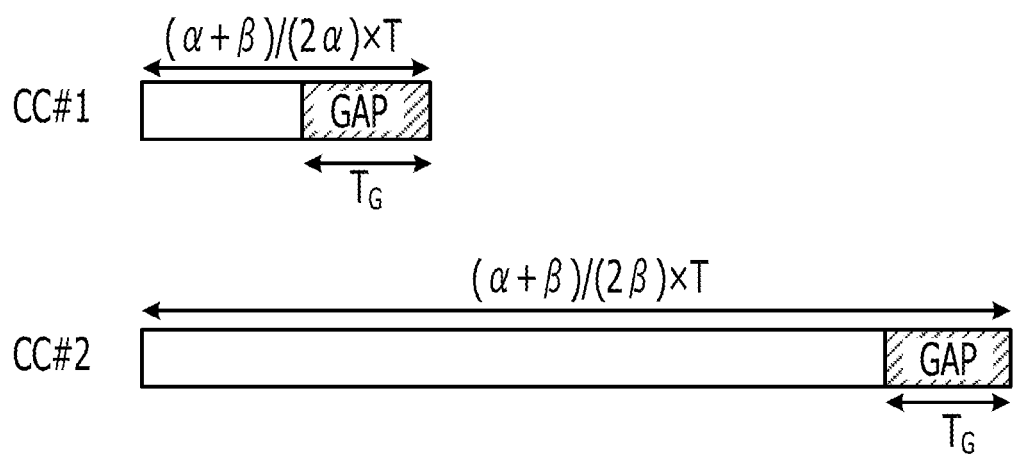
FIG. 19 illustrates an example of a process performed by the gap assignment unit.
Figure 20:
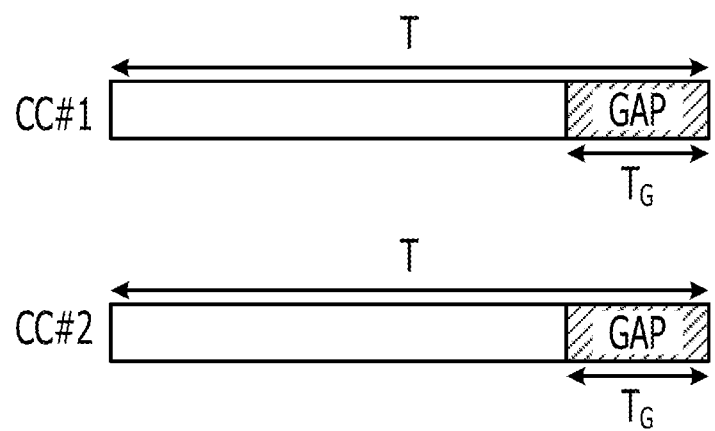
FIG. 20 illustrates an example of a process performed by the gap assignment unit.

Then, the gap assignment unit 132a assigns the gap having the determined cyclic period to each CC. For example, when the reception quality of CC#1 is lower than the reception quality of CC#2, as illustrated in FIG. 19, the gap assignment unit 132a assigns the gap having the cyclic period $(\alpha+\beta)/(2\alpha)\times T$ to CC#1, and assigns the gap having the cyclic period $(\alpha+\beta)/(2\beta)\times T$ to CC#2. When the reception quality of CC#1 is equal to the reception quality of CC#2, as illustrated in FIG. 20, the gap assignment unit 132a assigns the gap having the cyclic period T to CC#1 and CC#2. FIG. 19 and FIG. 20 each illustrate an example of a process performed by the gap assignment unit.

Figure 21:
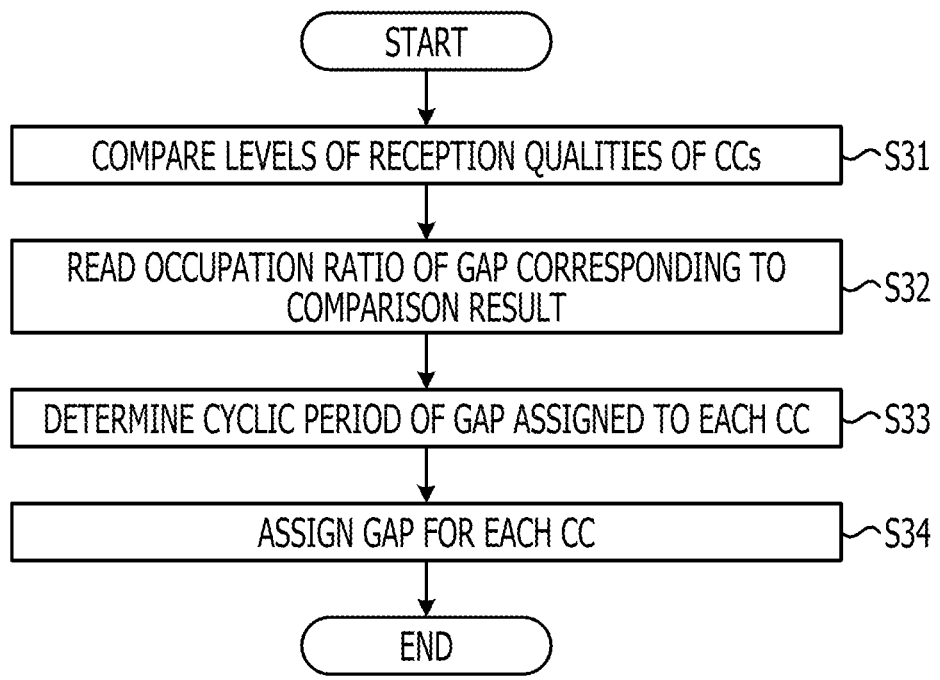
FIG. 21 is a flowchart illustrating the processing procedure of a gap assignment unit in a second embodiment.

Next, the processing procedure of the gap assignment unit 132a in a second embodiment will be described. FIG. 21 is a flowchart illustrating the processing procedure of the gap assignment unit 132a in the second embodiment. The processing procedure illustrated in FIG. 21 corresponds to S12 illustrated in FIG. 14.

As illustrated in FIG. 21, first, the gap assignment unit 132a compares the levels of the reception qualities of each CC, which have been obtained by the reception quality obtaining unit 131 (S31). Then, the gap assignment unit 132a reads the occupation ratio of the gap corresponding to the comparison result of the level relationship of the reception quality of each CC by referring to the correspondence table (S32). Then, the gap assignment unit 132a determines the cyclic period of the gap that is assigned to each CC within the certain time period by using the occupation ratio of the gap read from the correspondence table (S33). Then, the gap assignment unit 132a assigns the gap having the determined cyclic period to each CC.

Figure 22:
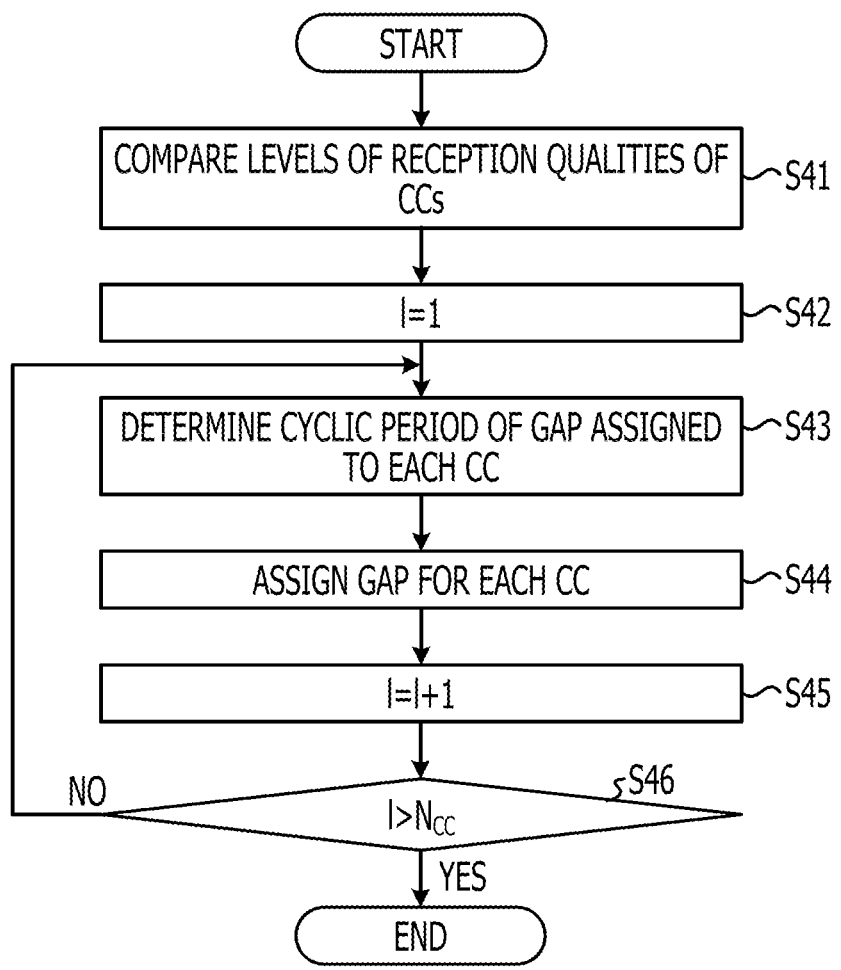
FIG. 22 is a flowchart illustrating the processing procedure of a gap assignment unit in a modification of the second embodiment.

In the above description of FIG. 21, a case has been described in which the gap assignment unit 132a assigns a gap to each CC by using a correspondence table. Alternatively, as illustrated in FIG. 22, the gap assignment unit 132a may assign a gap to each CC without referring to the correspondence table. In this case, the gap assignment unit 132a determines the cyclic period of the gap that is assigned to each CC within the certain time period based on the level relationship of the reception quality of each CC, which has been obtained by the reception quality obtaining unit 131 without referring to the correspondence table. FIG. 22 is a flowchart illustrating the processing procedure of the gap assignment unit 132a in a modification of the second embodiment. The processing procedure illustrated in FIG. 22 corresponds to S12 illustrated in FIG. 14.

As illustrated in FIG. 22, first, the gap assignment unit 132a compares the levels of the reception qualities of each CC, which have been obtained by the reception quality obtaining unit 131 (S41). Then, the gap assignment unit 132a sets "1" to a parameter I indicating the order of the reception quality of each CC (S42). More specifically, the gap assignment unit 132a selects the CC having the lowest reception quality based on the comparison result of the level relationship of the reception quality of each CC.

Next, the gap assignment unit 132a determines the cyclic period of the gap that is assigned to the CC that has been selected within the certain time period based on the level relationship of the reception quality of each CC (S43). More specifically, when the reception quality $\gamma_1$ of CC#1 is lower than the reception quality $\gamma_2$ of CC#2, the gap assignment unit 132a determines the cyclic period of the gap that is assigned to CC#1 within the certain time period T to be $(\gamma_1+\gamma_2)/(2\gamma_2) \times T$ and determines the cyclic period of the gap that is assigned to CC#2 to be $(\gamma_1+\gamma_2)/(2\gamma_1) \times T$. When the reception quality $\gamma_1$ of CC#1 is equal to the reception quality $\gamma_2$ of CC#2, the gap assignment unit 132a determines the cyclic period of the gap that is assigned to CC#1 and the cyclic period of the gap that is assigned to CC#2 within the certain time period T to be T. When the reception quality $\gamma_1$ of CC#1 is higher than the reception quality $\gamma_2$ of CC#2, the gap assignment unit 132a determines the cyclic period of the gap that is assigned to CC#1 within the certain time period T to be $(\gamma_1+\gamma_2)/(2\gamma_1) \times T$ and determines the cyclic period of the gap that is assigned to CC#2 within the certain time period T to be $(\gamma_1+\gamma_2)/(2\gamma_2) \times T$.

Then, the gap assignment unit 132a assigns the gap having the determined cyclic period for each CC (S44). Then, the gap assignment unit 132a increments I by 1 (S45). More specifically, the gap assignment unit 132a selects the CC having the second lowest reception quality based on the comparison result of the level relationship of the reception quality of each CC. When I is greater than the total number $N_{cc}$ of CCs (yes in S46), the gap assignment unit 132a ends the processing, and when I is smaller than the total number $N_{cc}$ of CCs (no in S46), the gap assignment unit 132a causes the process to return to S43.

As described above, the gap assignment unit 132a determines the cyclic period of the gap that is assigned to each CC within the certain time period based on the reception quality of each CC, which has been obtained by the reception quality obtaining unit 131. As a result, the gap is assigned to the CC having relatively low reception quality with a higher priority and thus, the occupation ratio of the gap per certain time period in the CC having relatively high reception quality is suppressed.

The gap assignment unit 132a may determine the time width of the gap that is assigned to each CC within the certain time period based on the reception quality of each CC, which has been obtained by the reception quality obtaining unit 131.

As has been described above, in the base station 10a according to the second embodiment, the gap assignment unit 132a determines the cyclic period or the time width of the gap that is assigned to each CC within the certain time period based on the reception quality of each CC, which has been obtained by the reception quality obtaining unit 131. Consequently, it is possible for the base station 10a to obviate the necessity to store the patterns of a plurality of gaps having different cyclic periods and time widths in advance in a storage unit and assign a gap at high speed to a CC having low reception quality while suppressing an increase in the storage capacity. As a result, since data may be transmitted efficiently by using a CC having high reception quality, it is possible to more improve the transmission rate of data as the whole of the wireless communication network system.

Third Embodiment

In the first embodiment, the base station selects, from the patterns of a plurality of gaps that have been stored in advance, a pattern of a gap such that the lower the reception quality of each CC is, the shorter the cyclic period is, and assigns the gap for each CC. In a third embodiment, an example will be described in which a base station sets, for each CC, the number of frequencies to be measured by a receiving station at one gap in accordance with the reception quality of each CC, and determines, by using the set number of frequencies, the cyclic period or the time width of the gap that is assigned to each CC within the certain time period.

Figure 23:
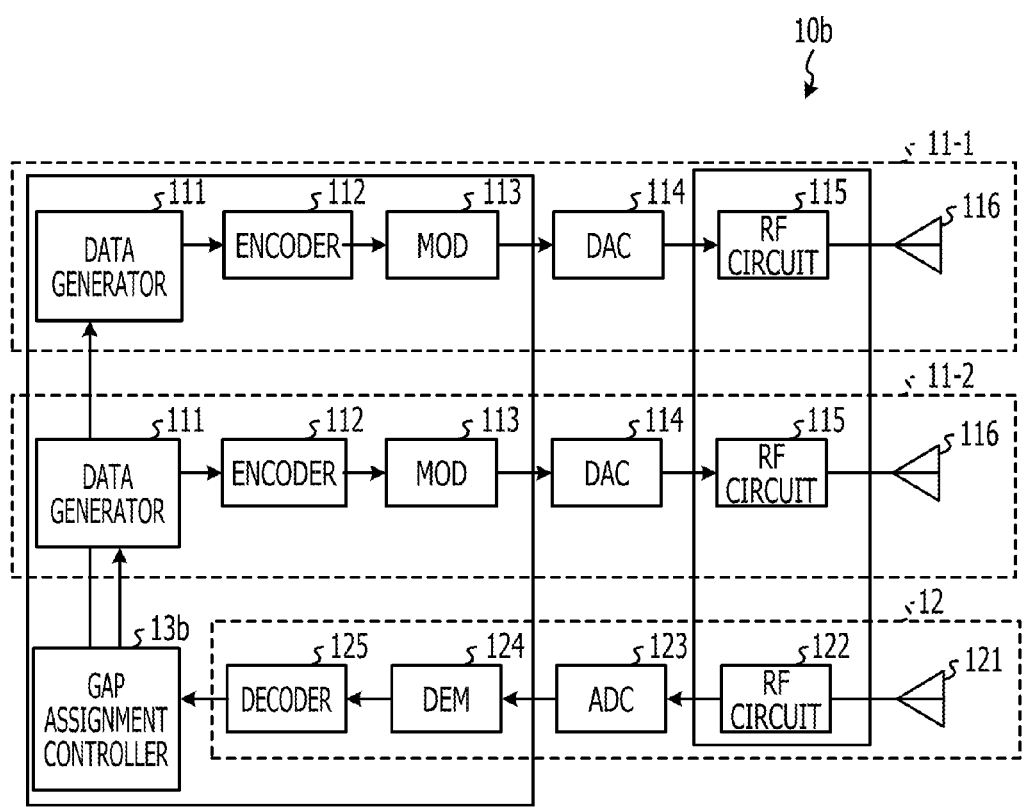
FIG. 23 illustrates an exemplary configuration of a base station in a communication system.

FIG. 23 illustrates an exemplary configuration of the base station 10b in the communication system. Since the exemplary configuration of the mobile device in the communication system is the same as that of the above-mentioned first embodiment, the description thereof is omitted here. Furthermore, components in FIG. 23, which are the same as those of the above-mentioned first embodiment, are designated with the same reference numerals, and thus, the descriptions thereof are omitted.

As illustrated in FIG. 23, the base station 10b includes the data transmission sections 11-1 and 11-2, the data receiving section 12, and the gap assignment controller 13b.

Figure 24:
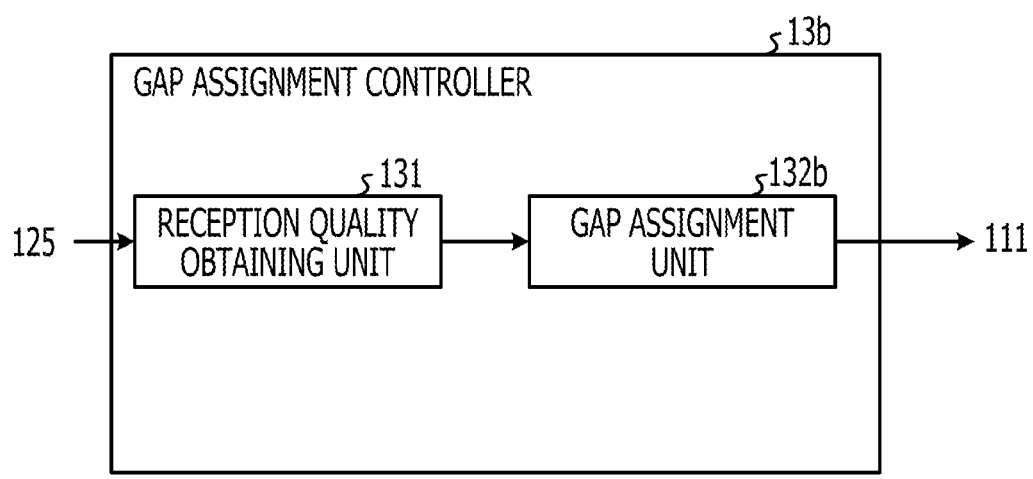
FIG. 24 illustrates an exemplary configuration of a gap assignment controller.

The gap assignment controller 13b controls the assignment of the gap to each CC based on the information fed back from the mobile device 50. FIG. 24 illustrates the exemplary configuration of the gap assignment controller 13b. The gap assignment controller 13b includes the reception quality obtaining unit 131 and a gap assignment unit 132b.

The gap assignment unit 132b sets, for each CC, the number of measured frequencies, which is the number of frequencies to be measured by the mobile device 50, in one gap in accordance with the reception quality of each CC, which has been obtained by the reception quality obtaining unit 131. Furthermore, the gap assignment unit 132b determines the cyclic period of the gap that is assigned to each CC within the certain time period by using the set number of measured frequencies for each CC.

Here, an example of processing performed by the gap assignment unit 132b will be described. In the following, it is assumed that the base station 10b and the mobile device 50 perform the transmission and reception of data by using $N_{cc}$ (>1) CCs. It is also assumed that the mobile device 50 may measure a maximum of $N_{freq}$ (>1) frequencies at one gap among the assigned gaps that are assigned for each CC, and may measure a total of $N_{cc} \times N_{freq}$ frequencies. It is further assumed that the base station 10b causes the mobile device 50 to measure $M_{freq}$ frequencies among a total of $N_{cc} \times N_{freq}$ frequencies.

First, the gap assignment unit 132b sets, for each CC, the number of measured frequencies, which is the number of frequencies to be measured by the mobile device 50 at one gap, in accordance with the reception quality of each CC, which has been obtained by the reception quality obtaining unit 131. More specifically, first, the gap assignment unit 132b sequentially sorts $N_{cc}$ CCs in descending order of reception quality obtained by the reception quality obtaining unit 131. Then, the gap assignment unit 132b sets, as the number of measured frequencies, a maximum of $N_{freq}$ frequencies that may be measured by the mobile device 50 at one gap to the CCs from the lowest reception quality to the A-th reception quality among the $N_{cc}$ CCs that have been sorted sequentially in descending order of reception quality. Furthermore, the gap assignment unit 132b sets, as the number of measured frequencies, B to the CC having the (A+1)th lowest reception quality among the $N_{cc}$ CCs that have been sorted sequentially in descending order of reception quality. Furthermore, the gap assignment unit 132b sets, as the number of measured frequencies, 0 to the CCs having the (A+2)th to $(N_{cc})$th lowest reception qualities among the $N_{cc}$ CCs that have been sorted sequentially in descending order of reception quality. A and B are calculated in accordance with Equation (5) and Equation (6) below, respectively.

$$A = \left\lfloor \frac{M_{freq}}{N_{freq}} \right\rfloor \quad (5)$$

$$B = M_{freq} \bmod N_{freq} \quad (6)$$

An example of the number of measured frequencies, which is set for each CC by the gap assignment unit 132b, is illustrated in FIG. 25. In the example illustrated in FIG. 25, it is assumed that $M_{freq}=2 \times N_{freq}+1$ and $N_{cc}=4$. Furthermore, four CC#1 to CC#4 are assumed to have reception qualities that decrease in order of CC#3, CC#1, CC#4, and CC#2. As illustrated in FIG. 25, the gap assignment unit 132b sets, as the number of measured frequencies, a maximum number $N_{freq}$ of frequencies that may be measured by the mobile device 50 at one GAP to CC#3 and CC#1 having the lowest to (A=2)th reception qualities among the four CC#1 to CC#4. Furthermore, the gap assignment unit 132b sets, as the number of measured frequencies, B=1 to CC#4 having the (A+1)=3rd lowest reception quality among the four CCs. Furthermore, the gap assignment unit 132b sets the number of measured frequencies with respect to CC#2 having the fourth lowest reception quality to 0.

Next, the gap assignment unit 132b determines the cyclic period of the gap that is assigned to each CC within the certain time period by using the set number of measured frequencies for each CC. More specifically, the gap assignment unit 132b determines the cyclic period of the gap so that the more the number of measured frequencies for each CC increases, the shorter the cyclic period of the gap that is assigned to each CC within the certain time period is. In the example illustrated in FIG. 25, the gap assignment unit 132b determines the cyclic period of the gap that is assigned to CC#3 within the certain time period T to be $(N_{freq}+N_{freq}+1)/(3N_{freq}) \times T$. Furthermore, the gap assignment unit 132b determines the cyclic period of the gap that is assigned to CC#1 within the certain time period T to be $(N_{freq}+N_{freq}+1)/(3N_{freq}) \times T$. Furthermore, the gap assignment unit 132b determines the cyclic period of the gap that is assigned to CC#4 within the certain time period T to be $(N_{freq}+N_{freq}+1)/(3\times1) \times T$.

Figure 26:
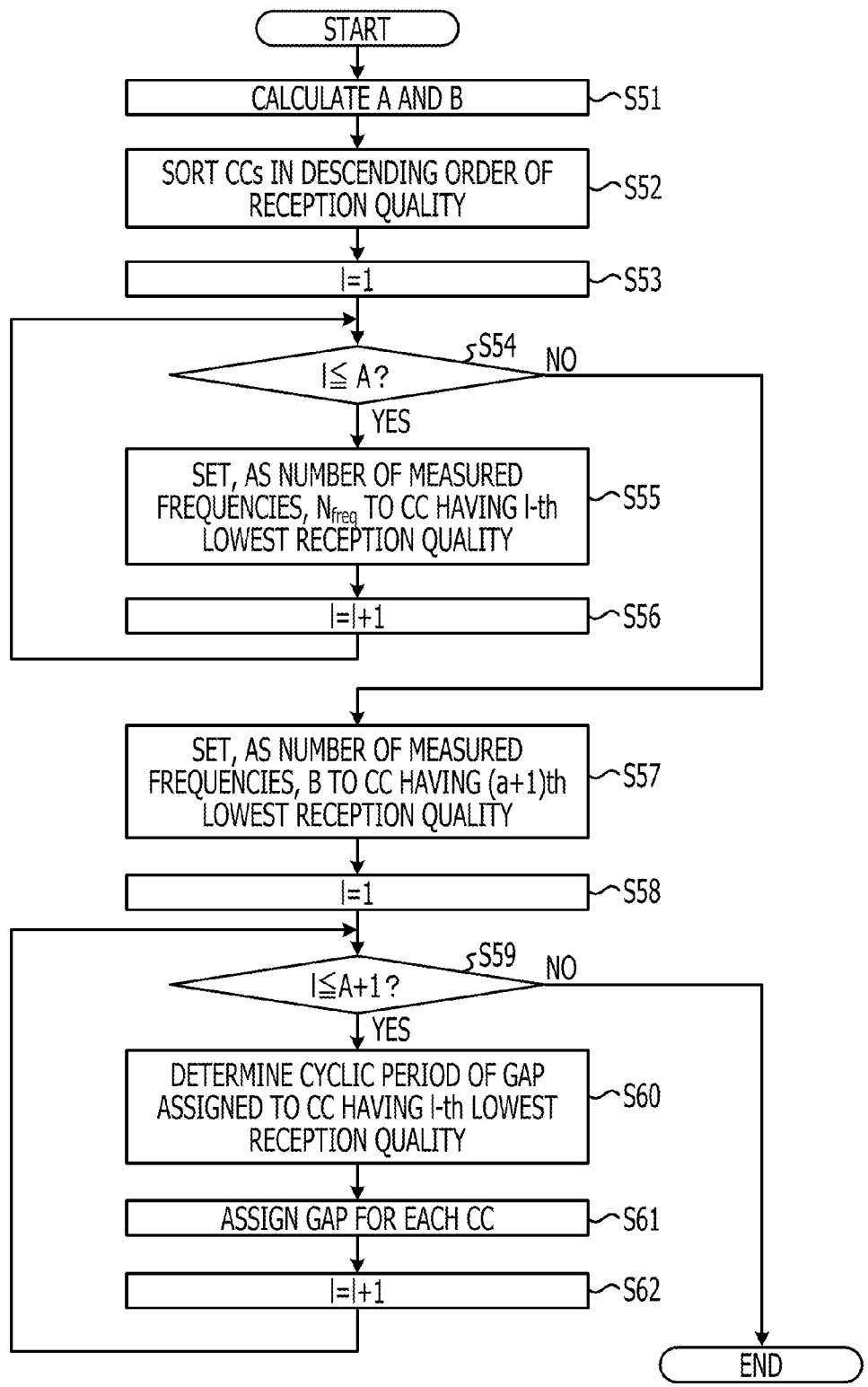
FIG. 26 is a flowchart illustrating the processing procedure of a gap assignment unit in a third embodiment.

Next, the processing procedure of the gap assignment unit 132b in a third embodiment will be described. FIG. 26 is a flowchart illustrating the processing procedure of the gap assignment unit 132b in the third embodiment. The processing procedure illustrated in FIG. 26 corresponds to S12 illustrated in FIG. 14.

As illustrated in FIG. 26, the gap assignment unit 132b calculates A and B (S51), and sorts the CCs in descending order of reception quality, which has been obtained by the reception quality obtaining unit 131 (S52). Then, the gap assignment unit 132b sets "1" to a parameter I indicating the order of the reception quality of each CC (S53). More specifically, the gap assignment unit 132b selects the CC having the lowest reception quality among the CCs that have been sorted in descending order of reception quality.

Next, when I is smaller than or equal to A (yes in S54), the gap assignment unit 132b sets, as the number of measured frequencies, $N_{freq}$ to the CC having the I-th lowest reception quality (S55). Then, the gap assignment unit 132b increments I by 1 (S56), and causes the process to return to S54. More specifically, the gap assignment unit 132b selects the CC having the next lowest reception quality among the CCs that have been sequentially sorted in descending order of reception quality.

On the other hand, when I exceeds A (no in S54), the gap assignment unit 132b sets, as the number of measured frequencies, B to the CC having the (A+1)th lowest reception quality (S57). Then, the gap assignment unit 132b resets "1" to I (S58). More specifically, the gap assignment unit 132b selects again the CC having the lowest reception quality among the CCs that have been sorted in descending order of reception quality.

Next, when I is smaller than or equal to (A+1) (yes in S59), the gap assignment unit 132b determines the cyclic period of the gap that is assigned to the CC having the Ith lowest reception quality by using the set number of measured frequencies for each CC (S60).

Then, the gap assignment unit 132b assigns the gap having the determined cyclic period for each CC (S61). Then, the gap assignment unit 132b increments I by 1, and causes the process to return to S59. More specifically, the gap assignment unit 132b selects again the CC having the next lowest reception quality. On the other hand, when I exceeds (A+1) (no in S59), the gap assignment unit 132b ends the processing.

As described above, the gap assignment unit 132b sets, for each CC, the number of measured frequencies in accordance with the reception quality of each CC, which has been obtained by the reception quality obtaining unit 131. Furthermore, the gap assignment unit 132b determines the cyclic period of the gap that is assigned to each CC within the certain time period by using the set number of measured frequencies for each CC. As a result, the gap is assigned to the CC having a relatively large number of measured frequencies with a higher priority and, the occupation ratio per certain time period of the gap in a CC having a relatively small number of measured frequencies is suppressed.

The gap assignment unit 132b may determine the time width of the gap that is assigned to each CC within the certain time period by using the set number of measured frequencies for each CC.

As has been described above, in the base station 10b according to the third embodiment, the gap assignment unit 132b sets, for each CC, the number of measured frequencies in accordance with the reception quality of each CC, which has been obtained by the reception quality obtaining unit 131. Furthermore, the gap assignment unit 132b determines the cyclic period of the gap that is assigned to each CC within the certain time period by using the set number of measured frequencies for each CC. Consequently, it is possible for the base station 10b to assign the gap to a CC having a large number of measured frequencies with a higher priority. As a result, data may be transmitted efficiently by using a CC having a small number of measured frequencies, and thus, it is possible to more improve the transmission rate of data as the whole of the wireless communication network system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission station comprising:
   communication circuitry configured to perform transmission and reception of data with a receiving station by using a plurality of wireless carriers whose frequency bands differ from one another; and
   a processor coupled to the communication circuit and configured to:
      obtain a reception quality of each of the wireless carriers, the reception quality being reported from the receiving station,
      sort the wireless carriers order of the obtained reception quality of the each of the wireless carriers,
      calculate a cyclic period for each of the wireless carriers; in accordance with the order of the obtained reception quality of the each of the wireless carriers, and
      retrieve and assign a gap having the calculated cyclic period for the each of the wireless carriers, the gap being a period during which transmission of the data is stopped and measurement of the reception quality is performed at a given time interval,
   the gap being arranged in a cyclic period that is shorter for a wireless carrier having a lower reception quality and longer for a wireless carrier having a higher reception quality,
   wherein the gap is assigned for the each of the wireless carriers within a certain time period.

2. The transmission station according to claim 1, further comprising:
   a storage that prestores patterns of the plurality of gaps whose cyclic periods or time widths differ from one another,
   wherein the processor selects, from the storage, the pattern of the gap so that the lower the obtained reception quality of the each of the wireless carriers is, the shorter the cyclic period is or the larger the time width is, and assigns the gap.

3. The transmission station according to claim 1, wherein the processor sets, for each of the wireless carriers, the number of frequencies to be measured by the receiving station in the corresponding gap in accordance with the obtained reception quality of the each of the wireless carriers, and determines the cyclic period or the time width of the gap that is assigned to the wireless carrier within a certain time period by using the set number of frequencies for the each of the wireless carriers.

4. The transmission station according to claim 1, wherein the processor obtains, as the reception quality of each of the wireless carriers, at least one of a signal power to interference and noise power ratio, a reference signal received quality, a channel quality indicator, and a channel capacity, which are reported from the receiving station.

5. A receiving station comprising:
   communication circuitry configured to transmit, to a transmission station, a reception quality of each of a plurality of wireless carriers whose frequency bands differ from one another, the transmission station performing transmission and reception of data with the receiving station by using the plurality of wireless carriers; and
   a processor coupled to the communication circuit and configured to set a gap to each of the wireless carriers, the gap being a period during which transmission of the data is stopped and measurement of the reception quality is performed at a given time interval,
   the gap being assigned to the each of the wireless carriers by the transmission station by sorting the wireless carriers in an order of the e reception quality of the each of the wireless carriers, calculating a cyclic period for each of the wireless carriers in accordance with the order of the reception quality of the each of the wireless carriers, retrieving and assigning the gap having the calculated cyclic period for the each of the wireless carriers,
   the gap being arranged by the transmission station in a cyclic period that is shorter for a wireless carrier having a lower reception quality and longer for a wireless carrier having a higher reception quality, and
   wherein the gap is assigned for the each of the wireless carriers within a certain time period.

6. A wireless communication system comprising:
   a transmission station configured to:
      perform transmission and reception of data with a receiving station by using a plurality of wireless carriers whose frequency bands differ from one another,
      obtain a reception quality of each of the wireless carriers,
      sort the wireless carriers in an order of the obtained reception quality of the each of the wireless carriers,
      calcilate a cyclic period for each of the wireless carriers in accordance with the order of the obtained reception quality of the each of the wireless carriers, and
      retrieve and assign a gap having the calculated cyclic period for the each of the wireless carriers, the gap being a period during which transmission of data is stopped and measurement of the reception quality is performed at a given time interval, and the gap being arranged in a cyclic period that is shorter for a wireless carrier having a lower reception quality and longer for a wireless carrier having a higher reception quality; and
   the receiving station configured to:
      transmit, to the transmission station, the reception quality of the each of the wireless carriers, and
      set the gap to the each of the wireless carriers, the gap being assigned to the each of the wireless carriers by the transmission station,
   wherein the gap is assigned to the each of the wireless carriers within a certain time period.

7. The wireless communication system according to claim 6,
wherein the transmission station further includes a storage that prestores patterns of the plurality of gaps whose cyclic periods or time widths differ from one another, and
wherein the transmission station selects, from the storage, the pattern of the gap so that the lower the obtained reception quality of the each of the wireless carriers is, the shorter the cyclic period is or the larger the time width is, and assigns the gap.

8. The wireless communication system according to claim 6, wherein the transmission station sets, for each of the wireless carriers, the number of frequencies to be measured by the receiving station in the corresponding gap in accordance with the obtained reception quality of the each of the wireless carriers, and determines the cyclic period or the time width of the gap that is assigned to the wireless carrier within a certain time period by using the set number of frequencies for the each of the wireless carriers.

9. The wireless communication system according to claim 6, wherein the transmission station obtains, as the reception quality of each of the wireless carriers, at least one of a signal power to interference and noise power ratio, a reference signal received quality, a channel quality indicator, and a channel capacity, which are reported from the receiving station.

10. A wireless communication method comprising:
performing transmission and reception of data between a transmission station and a receiving station by using a plurality of wireless carriers whose frequency bands differ from one another;
obtaining, in the transmission station, a reception quality of each of the wireless carriers, the reception quality being reported from the receiving station;
sorting the wireless carriers in an order of the obtained reception quality of he each of the wireless carriers;
calculating a cyclic period for each of the wireless in accordance with the order of the Obtained reception quality of the each of the wireless carriers; and
retrieving and assigning a gap having the calculated cyclic period the each of the wireless carriers,
the gap being a period during which transmission of the data is stopped and measurement of the reception quality is performed at a given time interval, and the gap being arranged in a cyclic period that is shorter for a wireless carrier having a lower reception quality and longer for a wireless carrier having a higher reception quality; and
wherein the gap is assigned for the each of the wireless carriers within a certain time period.

11. The wireless communication method according to claim 10, further comprising:
prestoring patterns of the plurality of gaps whose cyclic periods or time widths differ from one another, and
wherein the assigning including assigning the gap by selecting a pattern from the prestored patterns of the plurality of gaps so that the lower the obtained reception quality of the each of the wireless carriers is, the shorter the cyclic period is or the larger the time width is.

12. The wireless communication method according to claim 10, further comprising:
setting, for each of the wireless carriers, the number of frequencies to be measured by the receiving station in the corresponding gap in accordance with the reception quality of the each of the wireless carrier; and
determining, the cyclic period or the time width of the gap that is assigned to the wireless carrier within a certain time period by using the set number of frequencies for the each of the wireless carriers.

13. The wireless communication method according to claim 10, further comprising:
obtaining, as the reception quality of each of the wireless carriers, at least one of a signal power to interference and noise power ratio, a reference signal received quality, a channel quality indicator, and a channel capacity, which are reported from the receiving station.

* * * * *